US012607735B2

(12) United States Patent
    Al Jurdi et al.

(10) Patent No.: US 12,607,735 B2
(45) Date of Patent: Apr. 21, 2026

(54) METHOD AND APPARATUS FOR INDOOR POSITIONING USING RANGING AND SENSING INFORMATION

(71) Applicant: Samsung Electronics Co., Ltd., Suwon-si (KR)

(72) Inventors: Rebal Al Jurdi, Allen, TX (US); Hao Chen, Allen, TX (US); Jianyuan Yu, Blacksburg, VA (US); Boon Loong Ng, Plano, TX (US); Kyu-Hui Han, Suwon-si (KR); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 18/342,641

(22) Filed: Jun. 27, 2023

(65) Prior Publication Data
    US 2024/0125916 A1     Apr. 18, 2024

Related U.S. Application Data

(60) Provisional application No. 63/358,428, filed on Jul. 5, 2022.

(51) Int. Cl.
    *G01S 13/00*         (2006.01)
    *G01S 13/76*         (2006.01)
(52) U.S. Cl.
    CPC ................................. *G01S 13/765* (2013.01)
(58) Field of Classification Search
    CPC .................................................... G01S 13/765
    See application file for complete search history.

(56) References Cited

U.S. PATENT DOCUMENTS

| | | | |
|---|---|---|---|
| 7,756,082 B1 * | 7/2010 | Dhamdhere | ...... H04W 36/0085 |
| | | | 455/436 |
| 9,282,531 B1 | 3/2016 | Pajovic et al. | |
| 2015/0198447 A1 | 7/2015 | Chen et al. | |

(Continued)

FOREIGN PATENT DOCUMENTS

| | | |
|---|---|---|
| CN | 109982245 B | 1/2021 |
| CN | 112797985 A | 5/2021 |

(Continued)

OTHER PUBLICATIONS

Extended European Search Report issued Apr. 25, 2025 regarding Application No. 23835793.3, 13 pages.

(Continued)

*Primary Examiner* — Khai M Nguyen

(57)                ABSTRACT

An indoor positioning method includes scanning for registered Wi-Fi nodes with known coordinates to generate a list of the registered Wi-Fi nodes. The method also includes performing a ranging operation by (i) selecting nodes to range with from the list of the registered Wi-Fi nodes, and (ii) processing ranging responses from the selected nodes to generate a series of distance measurements. The method further includes obtaining a series of sensor readings generated by one or more inertial measurement units (IMUs) of a device. The method also includes estimating a position of the device based on the series of distance measurements and the series of sensor readings using first and second filtering operations that are performed in parallel.

20 Claims, 16 Drawing Sheets

(56) References Cited

U.S. PATENT DOCUMENTS

| | | | |
|---|---|---|---|
| 2016/0011294 | A1 | 1/2016 | Kim et al. |
| 2018/0295599 | A1* | 10/2018 | Bitra .................... G01S 5/021 |
| 2021/0058744 | A1 | 2/2021 | Padaki et al. |
| 2021/0168712 | A1* | 6/2021 | Cherian ............ H04W 52/0216 |
| 2021/0206390 | A1* | 7/2021 | Cheng ................. G01S 13/931 |
| 2021/0344541 | A1* | 11/2021 | Shellhammer ...... H04L 27/2605 |
| 2021/0400615 | A1 | 12/2021 | Smith et al. |
| 2022/0030536 | A1 | 1/2022 | Issakov et al. |
| 2022/0039058 | A1 | 2/2022 | Raj et al. |

FOREIGN PATENT DOCUMENTS

| | | | | |
|---|---|---|---|---|
| CN | 107094287 | B | | 9/2021 |
| CN | 113446061 | A | | 9/2021 |
| CN | 114485656 | A * | 5/2022 | ............. G01C 21/18 |
| JP | 2016539321 | A * | 12/2016 | ........... G01S 5/0295 |
| JP | 2017040503 | A | | 2/2017 |
| KR | 10-2367403 | B1 | | 2/2022 |
| KR | 10-2022-0077542 | A | | 6/2022 |
| WO | 2016146055 | A1 | | 9/2016 |
| WO | WO-2022100272 | A1 * | 5/2022 | ............. G01C 21/18 |

OTHER PUBLICATIONS

Xu et al., "Kalman Filter-Based Data Fusion of Wi-Fi RTT and PDR for Indoor Localization", IEEE Sensors Journal, vol. 21, No. 6, Jan. 2021, pp. 8479-5490.

Xu et al., "An Indoor 3-D Quadroto Localization Algorithm Based on WiFi RTT and MEMS Sensors", IEEE Internet of Things Journal, vol. 9, No. 21, May 2022, pp. 20879-20888.

International Search Report and Written Opinion issued Oct. 5, 2023 regarding International Application No. PCT/KR2023/009397, 8 pages.

Extended European Search Report issued Aug. 19, 2025 regarding Application No. 23835793.3, 14 pages.

* cited by examiner

602

702 — Read list of registered APs

704 — Scan for FTM-enabled APs

706 — Update list of detected APs

708 — Wait for $T_S$

One-shot offset estimation

Periodic offset estimation

Periodic offset estimation with overlapping windows

Continuous offset estimation

METHOD AND APPARATUS FOR INDOOR POSITIONING USING RANGING AND SENSING INFORMATION

CROSS-REFERENCE TO RELATED APPLICATION(S) ANI) CLAIM OF PRIORITY

This application claims priority under 35 U.S.C. § 119(e) to U.S. Provisional Patent Application No. 63/358,428 filed on Jul. 5, 2022, which is hereby incorporated by reference in its entirety.

TECHNICAL FIELD

This disclosure relates generally to wireless communications systems. Embodiments of this disclosure relate to methods and apparatuses for indoor positioning using ranging and sensing information.

BACKGROUND

Indoor positioning has grown in popularity over the last decade in parallel with the growth in the number of personal wireless devices as well as wireless infrastructure. A variety of indoor positioning use cases include smart homes and buildings, surveillance, disaster management, industry and healthcare. All of these require wide availability and good accuracy. Most conventional positioning techniques suffer from one or more drawbacks, including inaccuracy, impracticality, and uncommonness. Ultra-wide band (UWB) wireless technology falls under this broad category. While UWB provides great accuracy, UWB transceivers for use as ranging anchor points are uncommon compared to Wi-Fi, which can be found in most commercial and residential spaces. Given the pervasiveness of Wi-Fi access points and devices, Wi-Fi positioning techniques have become strong contenders for indoor positioning.

SUMMARY

Embodiments of the present disclosure provide methods and apparatuses for indoor positioning using ranging and sensing information.

In one embodiment, an indoor positioning method includes scanning for registered Wi-Fi nodes with known coordinates to generate a list of the registered Wi-Fi nodes. The method also includes performing a ranging operation by (i) selecting nodes to range with from the list of the registered Wi-Fi nodes, and (ii) processing ranging responses from the selected nodes to generate a series of distance measurements. The method further includes Obtaining a series of sensor readings generated by one or more inertial measurement units (IMUs) of a device. The method also includes estimating a position of the device based on the series of distance measurements and the series of sensor readings using first and second filtering operations that are performed in parallel.

In another embodiment, a device includes a transceiver and a processor operably connected to the transceiver. The processor is configured to: scan for registered Wi-Fi nodes with known coordinates to generate a list of the registered Wi-Fi nodes; perform a ranging operation by (i) selecting nodes to range with from the list of the registered Wi-Fi nodes, and (ii) processing ranging responses from the selected nodes to generate a series of distance measurements; obtain a series of sensor readings generated by one or more inertial measurement units (IMUs) of a device; and estimate a position of the device based on the series of distance measurements and the series of sensor readings using first and second filtering operations that are performed in parallel.

In another embodiment, a non-transitory computer readable medium includes program code that, when executed by a processor of a device, causes the device to: scan for registered Wi-Fi nodes with known coordinates to generate a list of the registered Wi-Fi nodes; perform a ranging operation by (i) selecting nodes to range with from the list of the registered Wi-Fi nodes, and (ii) processing ranging responses from the selected nodes to generate a series of distance measurements; obtain a series of sensor readings generated by one or more inertial measurement units (IMUs) of a device; and estimate a position of the device based on the series of distance measurements and the series of sensor readings using first and second filtering operations that are performed in parallel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a, compact disc (CD), a digital video disc (DVD), or any other type of memory. A "non-transitory" computer eadable medium excludes wired, wireless, optical, or other communication links that transport transitory electrical or other signals. A non-transitory computer readable medium includes media where data can be permanently stored and media where data can be stored and later rewritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Figure 1:
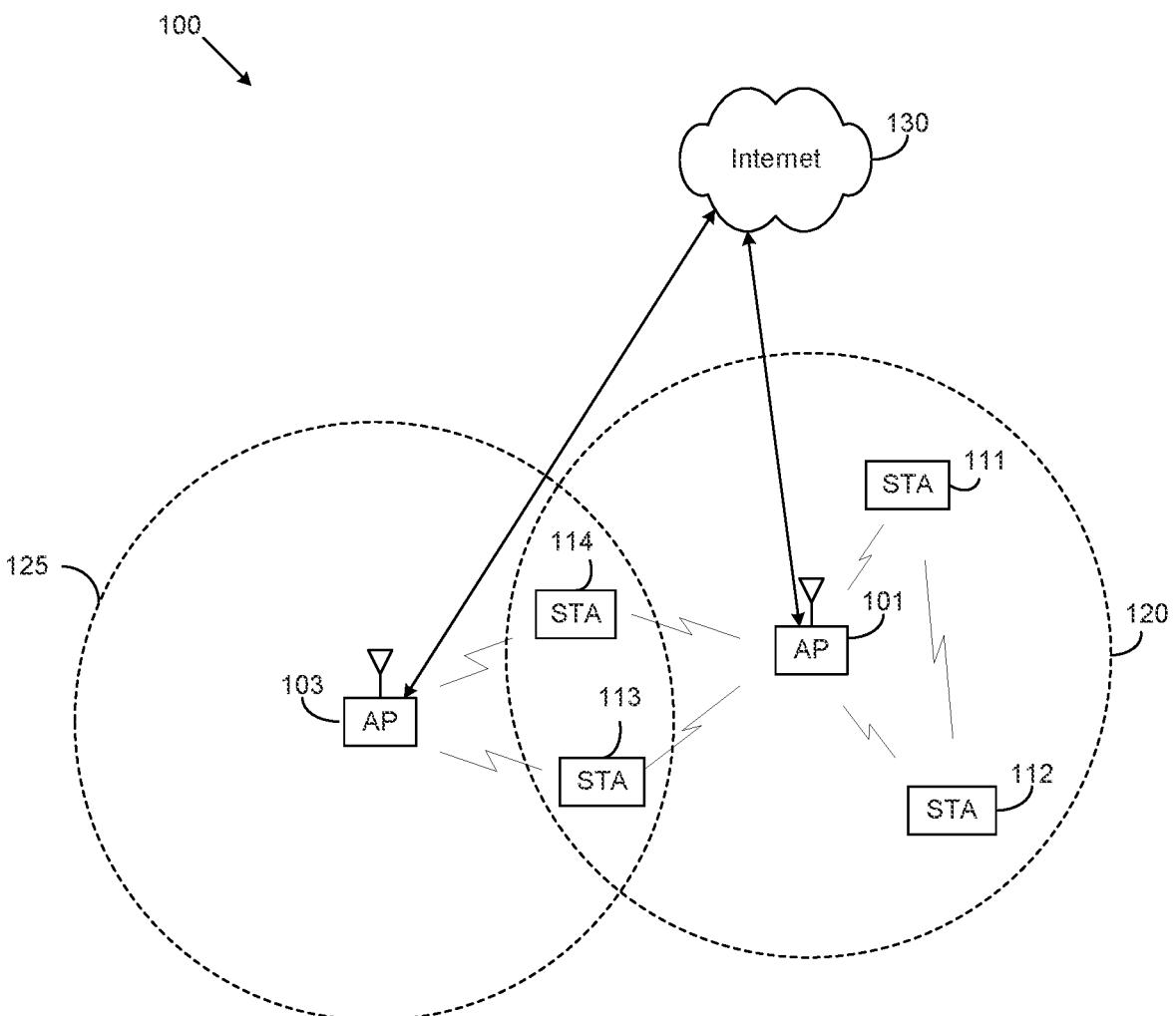
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating indoor positioning using ranging and sensing information. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provide STAs with direct wireless broadband access to the network 130. Further, the APs 101 and/or 103 could provide access to other or additional external networks, such as external telephone networks or other types of data networks.

Figure 2A:
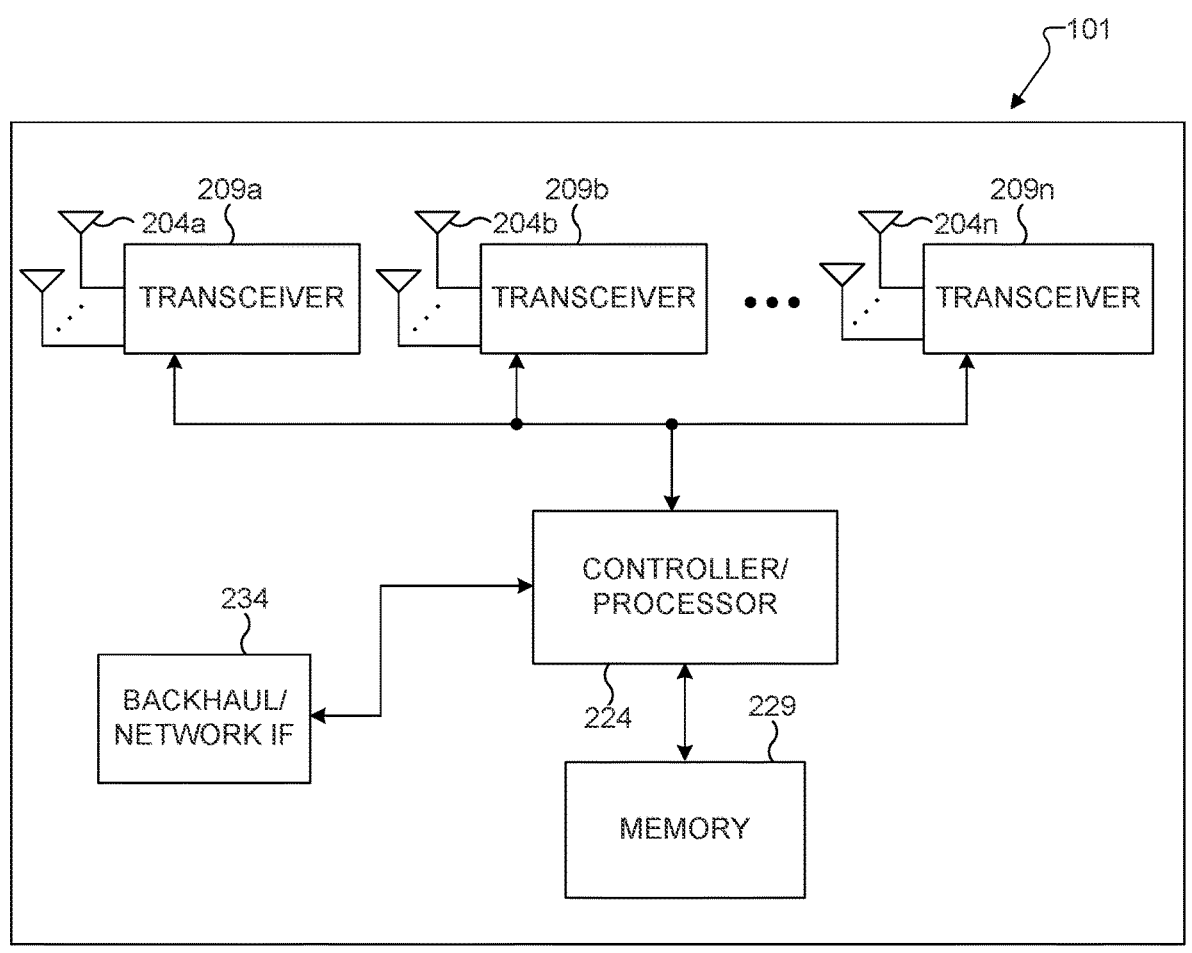
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n and multiple transceivers 209a-209n. The AP 101 also includes a controller/processor 224, a memory 229, and a backhaul or network interface 234. The transceivers 209a-209n receive, from the antennas 204a-204n, incoming radio frequency (RF) signals, such as signals transmitted by STAs 111-114 in the network 100. The transceivers 209a-209n down-convert the incoming RF signals to generate IF or baseband signals. The IF or baseband signals are processed by receive (RX) processing circuitry in the transceivers 209a-209n and/or controller/processor 224, which generates processed baseband signals by filtering, decoding, and/or digitizing the baseband or IF signals. The controller/processor 224 may further process the baseband signals.

Transmit (TX) processing circuitry in the transceivers 209a-209n and/or controller/processor 224 receives analog or digital data (such as voice data, web data, e-mail, or interactive video game data) from the controller/processor 224. The TX processing circuitry encodes, multiplexes, and/or digitizes the outgoing baseband data to generate processed baseband or IF signals. The transceivers 209a-209n up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the transceivers 209a-209n in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including facilitating indoor positioning using ranging and sensing information. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating indoor positioning using ranging and sensing information. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. Alternatively, only one antenna and transceiver path may be included, such as in legacy APs. Also, various components in FIG. 2A could be combined, further subdivided, or omitted and additional components could be added according to particular needs.

Figure 2B:
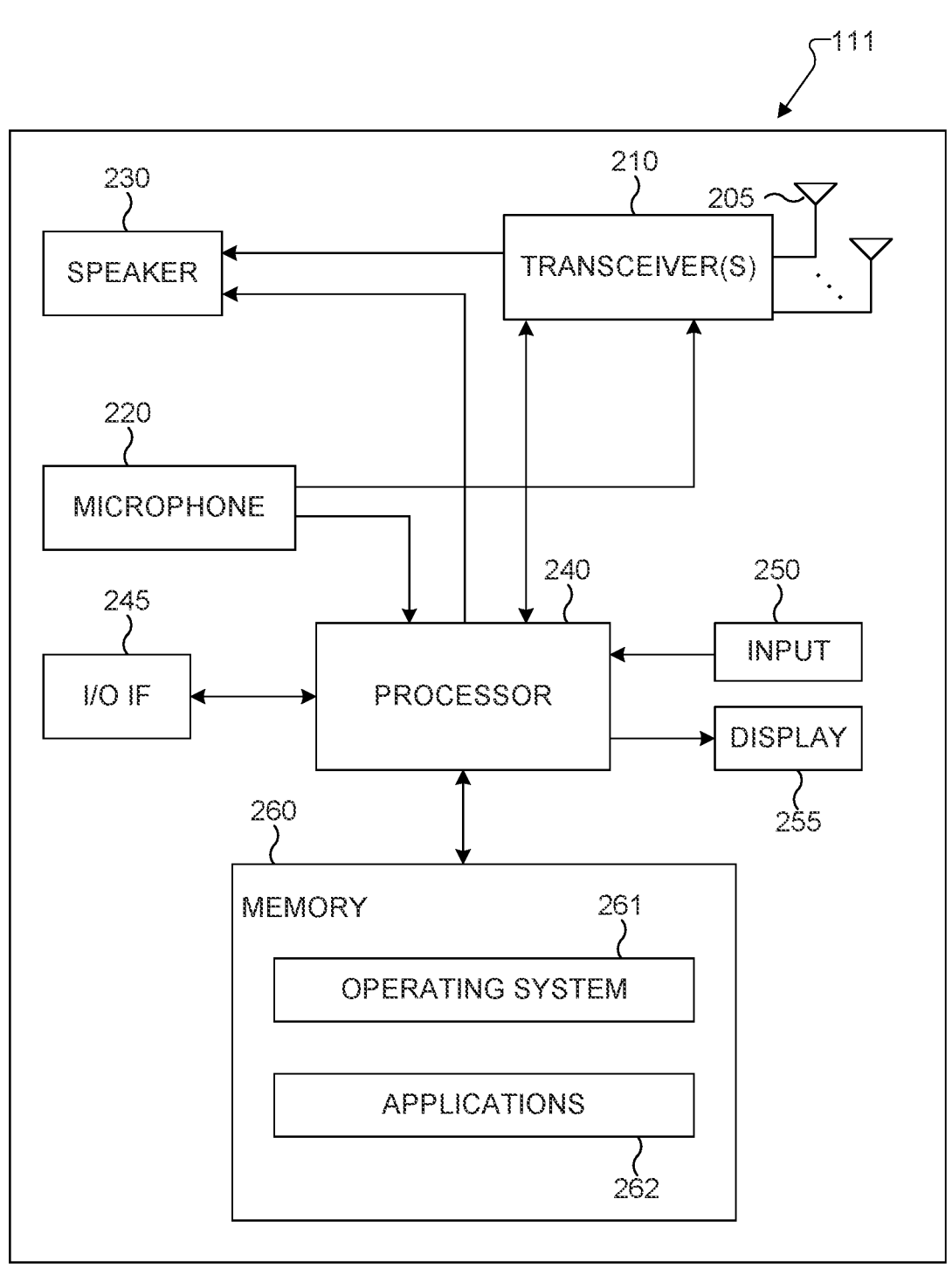
FIG. 2B illustrates an example STA according to various embodiments of the present disclosure.

FIG. 2B illustrates an example STA 111 according to various embodiments of the present disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, transceiver(s) 210, a microphone 220, a speaker 230, a processor 240, an input/output (I/O) interface (IF) 245, an input 250, a display 255, and a memory 260. The memory 260 includes an operating system (CSS) 261 and one or more applications 262.

The transceiver(s) 219 receives from the antenna(s) 205, an incoming RF signal (e.g., transmitted by an AP 101 of the network 100). The transceiver(s) 210 down-converts the incoming RF signal to generate an intermediate frequency (IF) or baseband signal. The IF or baseband signal is processed by RX processing circuitry in the transceiver(s) 210 and/or processor 240, which generates a processed baseband signal by filtering, decoding, and/or digitizing the baseband or IF signal. The RX processing circuitry sends the processed baseband signal to the speaker 230 (such as for voice data) or is processed by the processor 240 (such as for web browsing data).

TX processing circuitry in the transceiver(s) 210 and/or processor 240 receives analog or digital voice data from the microphone 220 or other outgoing baseband data (such as web data, e-mail, or interactive video game data) from the processor 240. The TX processing circuitry encodes, multiplexes, and/or digitizes the outgoing baseband data to generate a processed baseband or IF signal. The transceiver(s) 210 up-converts the baseband or IF signal to an RF signal that is transmitted via the antennas) 205.

The processor 240 can include one or more processors and execute the basic OS program 261 stored in the memory 260 in order to control the overall operation of the STA 111. In one such operation, the processor 240 controls the reception of forward channel signals and the transmission of reverse channel signals by the transceiver(s) 210 in accordance with well-known principles. The processor 240 can also include processing circuitry configured to facilitate indoor positioning using ranging and sensing information. In some embodiments, the processor 240 includes at least one microprocessor or microcontroller.

The processor 240 is also capable of executing other processes and programs resident in the memory 260, such as operations for facilitating indoor positioning using ranging and sensing information. The processor 240 can move data into or out of the memory 260 as required by an executing process. In some embodiments, the processor 240 is configured to execute a plurality of applications 262, such as applications for facilitating indoor positioning using ranging and sensing information. The processor 240 can operate the plurality of applications 262 based on the OS program 261 or in response to a signal received from an AP. The processor 240 is also coupled to the I/O interface 245, which provides STA 111 with the ability to connect to other devices such as laptop computers and handheld computers. The I/O interface 245 is the communication path between these accessories and the processor 240.

The processor 240 is also coupled to the input 250, which includes for example, a touchscreen, keypad, etc., and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the processor 240. Part of the memory 260 could include a random-access memory (RAM) and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MEM communication with an AP 101. In another example, the STA 111 may not include voice communication or the processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As discussed above, indoor positioning has grown in popularity over the last decade in parallel with the growth in the number of personal wireless devices as well as wireless infrastructure. A variety of indoor positioning use cases include smart homes and buildings, surveillance, disaster management, industry and healthcare. All of these require wide availability and good accuracy. Most conventional positioning techniques suffer from one or more drawbacks, including inaccuracy, impracticality, and uncommonness. Ultra-wide band (UWB) wireless technology falls under this broad category. While UWB provides great accuracy, UWB transceivers for use as ranging anchor points are uncommon compared to which can be found in most commercial and residential spaces. Given the pervasiveness of Wi-Fi access points and devices, Wi-Fi positioning techniques have become strong contenders for indoor positioning. In particular, Wi-Fi round-trip time (RTT) has arguably become the strongest contender for indoor positioning.

Furthermore, WIT standardizes the Fine Timing Measurement (FTM) mechanism for accurate ranging. FTM is a wireless network management procedure, defined in IEEE 802.11-2016 (unofficially known to be defined under 802.11mc), that allows a Wi-Fi station (STA) to accurately measure the distance from other Wi-Fi nodes (e.g., STAs or APs) by measuring the RTT between the two.

In an example where a STA measures its distance from other STAs, a STA wanting to localize itself (known as the initiating STA) with respect to other STAs (known as responding STAs) schedules an FTM session during which the STAs exchange messages and measurements. The FTM session includes three phases: negotiation, measurement, and termination.

Figures 3, 4:
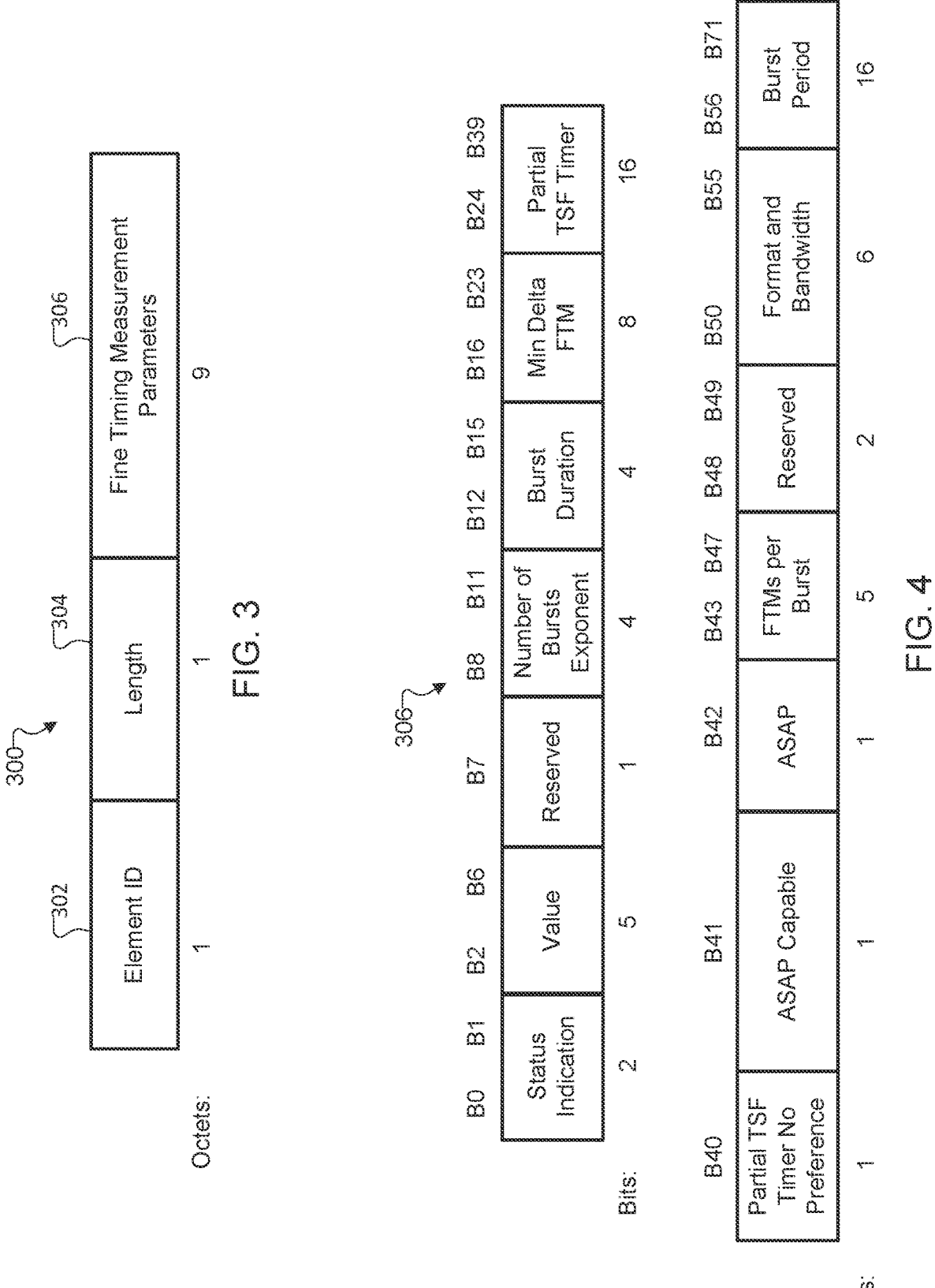
FIG. 3 illustrates an example format of the Parameters element provided in IEEE 802.11-2016.
FIG. 4 illustrates an example format of the FTM Parameters field provided in IEEE 802.11-2016.

In the negotiation phase, the initiating STA negotiates key parameters with the responding STA, such as frame format and bandwidth, number of bursts, burst duration, the burst period, and the number of measurements per burst. The negotiation starts when the initiating STA sends an FTM Request frame (a Management frame with subtype Action) called Initial FTM Request frame to the responding STA. The Initial FTM Request frame contains the negotiated parameters and their values in the frame's FTM Parameters element. The responding STA responds with an FTM frame called Initial FTM frame, which either approves of or overwrites the parameter values proposed by the initiating STA. FIG. 3 illustrates an example format of the FTM Parameters element provided in IEEE 802.11-2016. As shown in FIG. 3, the FTM Parameters element 300 includes an element ID 302, a length 304, and a FTM Parameters field 306. FIG. 4 illustrates an example format of the FTM Parameters field 306 provided in IEEE 802.11-2016.

Figure 5:
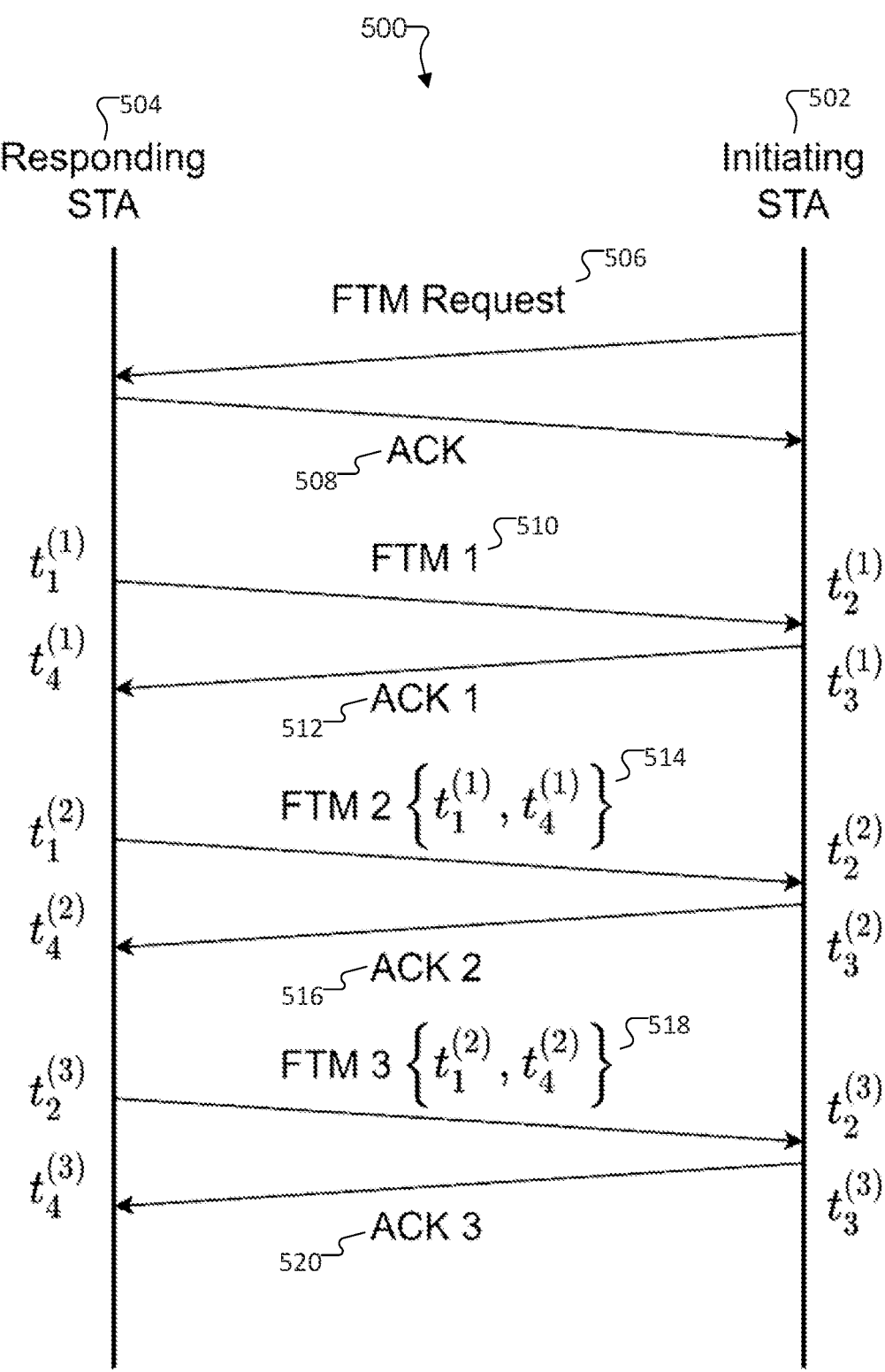
FIG. 5 illustrates an example measurement phase of an FTM session comprising one burst and three measurements (FTMs) per burst.

The measurement phase includes one or more bursts, and each burst includes one or more Fine Time measurements. The duration of a burst and the number of measurements therein are defined by the parameters Burst Duration and FTMs Per Burst. The bursts are separated by an interval defined by the parameter Burst Duration. FIG. 5 illustrates an example measurement phase 500 of an FTM session comprising one burst and 3 measurements (FTMs) per burst.

As shown in FIG. 5, the initiating STA (I-STA) 502 sends an Initial FTM Request frame 506 to the responding STA (R-STA) 504, triggering the start of the FTM session. The R-STA 504 responds with an ACK 508.

The R-STA 504 then sends the first FTM frame 510 to the I-STA 502 and captures the time it is sent $$t_1^{(1)}.$$

Upon receiving the first FTM frame 510, the I-STA 502 captures the time it was received $$t_2^{(1)}.$$

The I-STA 502 responds with an ACK 512, and captures the time it is sent $$t_3^{(1)}.$$

Upon receiving the ACK 512, the R-STA 504 captures the time it was received $$t_4^{(1)}.$$

The R-STA 504 sends a second FTM frame 514 to the I-STA 502 and captures the time it is sent $$t_1^{(2)}.$$

The purpose of the second FTM frame 514 is twofold: First, the second FTM frame 514 is a follow-up to the first FTM frame 510, i.e., it is used to transfer the timestamps $$t_1^{(1)} \text{ and } t_4^{(1)}$$

recorded by the R-STA 504. Second, the second FTM frame 514 starts a second measurement. Upon receiving the second FTM frame 514, the I-STA 502 extracts the timestamps $$t_1^{(1)} \text{ and } t_4^{(1)}$$

and computes the RTT according to the following equation:

$$RTT = \left(t_4^{(1)} - t_1^{(1)}\right) - \left(t_3^{(1)} - t_2^{(1)}\right).$$

The I-STA 502 also responds with an ACK 516, and captures the time the second FTM frame 514 was received $$t_2^{(2)}.$$

The two STAB 502 and 504 continue exchanging FTM frames and ACKs for as many measurements as has been negotiated between the two. In the measurement phase 500, this includes a third FTM frame 518 and a third ACK 520.

In order to be useful for positioning and proximity apps, the RTT between the two STAs 502 and 504 can be translated into a distance, such as by the following equation:

$$d = \frac{RTT}{2}c.$$

where d is the distance between the two STAs and c is the speed of light.

Each ELM of the burst will yield a distance sample, with multiple distance samples per burst. Given multiple FTM bursts and multiple measurements per burst, the distance samples can be combined in different ways to produce a representative distance measurement. For example, the mean distance, the median distance, or some other percentile of distance can be reported. Furthermore, other statistics (e.g., the standard deviation) could be reported as well to be used by the positioning algorithm.

The RTT is only useful because it can be converted into a distance, and distances can be combined to determine a position. Wi-Fi, the wireless technology encompassing FTM, is not the only technology that can provide an estimate of RTT. Ultra-wide band (UWB), as defined in IEEE 802.15.4z, also has standardized mechanisms to measure and report RTT as well as other metrics such as time of flight (ToF). UWB can also be used to measure the time difference of arrival (TDoA) of signals from two anchor points which can be readily converted into a difference of distances from the two anchor points. Finally, all wireless receivers, regardless of the technology they use, can roughly estimate their distance from the wireless transmitters by measuring the power of the received signal, e.g., the received signal strength indicator, or RSSI in WiFi. The aforementioned quantities, RTT, ToF, TDoA, and RSSI, can all be converted into distances which in turn could be combined to estimate a position. This disclosure describes a positioning algorithm that is not exclusive to one type of ranging measurement.

Pedestrian Dead Reckoning

Dead reckoning is a method of estimating the position of a moving object using the object's last known position by adding to that adding incremental displacements. Pedestrian dead reckoning (PDR) refers specifically to the scenario where the object in question is a pedestrian walking in an indoor or outdoor space. With the proliferation of sensors inside smart devices (e.g., smartphones, tablets, smartwatches, and the like), PDR has naturally evolved to supplement wireless positioning technologies that have been long supported by these devices such as Wi-Fi and cellular service, as well as more recent and less common technologies such as UWB.

Extended Kalman Filter (EKF)

A Kalman filter recursively estimates the state of a dynamical system from a sequence of measurements obtained over time and an assumption of state trajectory. The Kalman filter assumes an underlying system that is modeled by two linear equations: (i) a state transition/motion equation, and (ii) a measurement/observation equation.

The motion equation describes the evolution of the state of the system and relates the current state to a previous state, such as by the following:

$$x_k = A_k x_{k-1} + B_k u_k + v_k,$$

where $x_k$ is the current state, $x_{k-1}$ is the last state, $A_k$ is the state transition matrix, $u_k$ is the current input, $B_k$ is the control/input matrix, and $v_k \sim N(0, Q_k)$ is the process noise which represents uncertainty in state.

The measurement equation relates the current observation to the current state, such as by the following:

$$y_k = H_k x_k + w_k,$$

where $y_k$ is the latest observation, $H_k$ is the observation matrix, and $w_k \sim N(0, Q_k)$ is the observation noise.

At each time index k, the Kalman filter estimates the state of the system by applying a prediction step followed by an update step. The outcome of these two steps is the state estimate $\hat{x}_k$ at time index k and its covariance matrix $P_k$ which are in turn used to estimate the states at later points in time.

In the prediction step, the Kalman filter predicts the current state $\hat{x}_{k|k-1}$ (a priori estimate) from the most recent state estimate $\hat{x}_{k-1}$, its covariance $P_{k-1}$, and any inputs using the motion equation as follows:

$$\hat{x}_{k|k-1} = A_k \hat{x}_{k-1} + B_k u_k,$$

$$P_{k|k-1} = A_k P_k A^*_k + Q_k,$$

In the update step, the Kalman filter uses the latest observation to update its prediction and obtain the (a posteriori) state estimate $\hat{x}_k$ and its covariance $P_k$ as follows:

$$\hat{x}_k = \hat{x}_{k|k-1} + K_k(y_k - H_k \hat{x}_{k|k-1}),$$

$$P_k = (I - K_k H_k) P_{k|k-1},$$

where $K_k$ is the Kalman gain and is a function of the a priori estimate covariance $P_{k|k-1}$, observation matrix $H_k$, and observation noise covariance matrix $R_k$.

The extended Kalman filter (EKF) is an adaptation of the Kalman filter for handling non-linearities in the motion or measurement models. If the motion or measurement equations are not linear, the Kalman filter could not be used unless these equations are linearized. Consider the following non-linear motion and measurement equations:

$$x_k = f_k(x_{k-1}, u_k) + v_k,$$

$$y_k = h_k(x_k) + w_k,$$

where $f_k$ and $h_k$ are non-linear functions. The EKF applies the prediction and update steps as follows:
Prediction Step:

$$\hat{x}_{k|k-1} = f_k(\hat{x}_{k-1}, u_k),$$

$$P_{k|k-1} = F_k P_k F^*_k + Q_k,$$

$$\text{where } F_k = \frac{\partial f_k(x, u)}{\partial x} \Big|_{x = \hat{x}_{k-1}, u = u_k}.$$

Update Step:

$$\hat{x}_k = \hat{x}_{k|k-1} + K_k(y_k - H_k \hat{x}_{k|k-1}),$$

$$P_k = (I - K_k H_k) P_{k|k-1},$$

$$\text{where } F_k = \frac{\partial h_k(x)}{\partial x} \Big|_{x = \hat{x}_{k-1}}.$$

The state estimate $\hat{x}_k$ and its covariance $P_k$ are propagated to track the state of system. In the context of positioning, the state is the device position. In the context of Wi-Fi RTT indoor positioning, the observations are RTT distance measurements.

Most of the existing positioning techniques suffer from one or more of the following drawbacks: inaccuracy, impracticality, and uncommonness. Even though Wi-Fi RTT is a promising technology that marries the ubiquity of Wi-Fi with the accurate ranging techniques of position-centric technologies like UWB, there remains a set of challenging problems facing accurate and smooth positioning. First, as discussed above, Wi-Fi RTT measurement can suffer from both low precision and low accuracy, with the latter leading to a steady shift in position that may be difficult to detect and overcome. Second, ranging with all discovered APs can reduce the measurement rate leading to abrupt changes in position estimates. Third, the APs go in and out of range as the user moves in and out of their coverage areas, so making ranging requests to an AP outside of its coverage area can crowd the wireless channel with wasteful frames. Additionally, measurement errors and bias at the level of the IMU sensors lead to a drift in the device trajectory if sensor readings were taken at face value.

To address these and other issues, this disclosure provides systems and methods for indoor positioning using ranging and sensing information. As described in more detail below, the disclosed embodiments provide filtering techniques and sensor-driven motion models used therein to ensure appropriate fusion between RTT ranging measurements and sensor measurements and enhance positioning accuracy. Note that while some of the embodiments discussed below are described in the context of smart phones, these are merely examples. It will be understood that the principles of this disclosure may be implemented in any number of other suitable contexts or systems, including other portable electronic devices (e.g., tablets, laptops, and the like).

Figure 6:
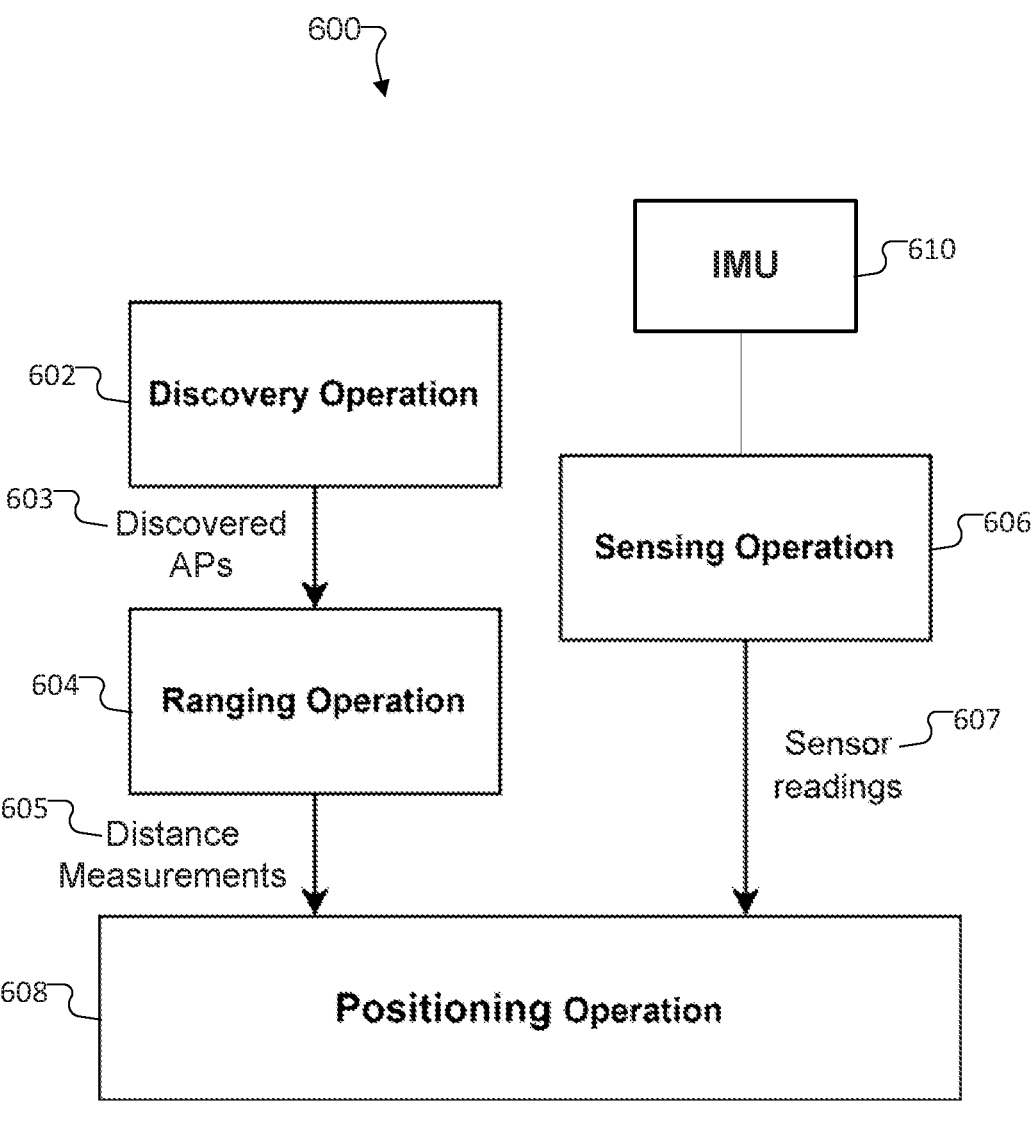
FIG. 6 illustrates an example process for indoor positioning using ranging and sensing information according to various embodiments of the present disclosure.

FIG. 6 illustrates an example process 600 for indoor positioning using ranging and sensing information according to various embodiments of the present disclosure. The embodiment of the process 600 shown in FIG. 6 is for illustration only. Other embodiments of the process 600 could be used without departing from the scope of this disclosure. For ease of explanation, the process 600 will be described as being implemented in the STA 111 of FIG. 1. However, the process 600 could be implemented in any other suitable device.

Depending on the implementation, various elements of the process 600 can be implemented in software, firmware, hardware, or a combination of two or more of these. In software, various elements of the process 600 can be implemented as an application, or app, deployed on the STA 11, which can be a Wi-Fi-capable device (e.g., a smart phone or tablet) that a user can interact with. Additionally, or alternatively, various elements of the process 600 can be implemented as a service running in the background that provides, through an API with a service, the device position in this case. Additionally, or alternatively, various elements of the process 600 can be deployed in the cloud or on a server where it communicates inputs (measurements) and outputs (position estimates) with the STA 111 over an internet connection (e.g., over Wi-Fi or the cellular network). Various elements of the process 600 can additionally or alternatively be implemented in firmware or hardware, as long as an API with the Wi-Fi MAC layer exists to send and receive ranging requests.

The process 600 combines multiple high-level operations that may run in sequence or in parallel. The multiple operations include a discovery operation 602, a ranging operation 604, a sensing operation 606, and a positioning operation 608. In the discovery operation 602, the STA 111 discovers anchor points 603 to range with. These anchor points 603 can be, e.g., FTM-enabled anchor points (such as APs). In the ranging operation 604, the STA 111 selects APs 603 to range with, obtains ranging measurements from the selected APs 603, and converts the measurements into distance measurements 605. In the sensing operation 606, the STA 111 collects sensor readings 607 from one or more sensors of an inertial measurement unit (IMU) 610 that forms part of the STA 111. The sensors can include, e.g., a magnetometer, an accelerometer, a gyroscope, and the like. The STA 111 collects the sensor readings 607 on a continuous basis, detects the step, and calculates step size and direction. In the positioning operation 608, the STA 111 estimates the position of the STA 111 from the distance measurements 605 and the sensor readings 607. Further details about each of the operations 602, 604, 606, and 608 are provided below.

Discovery Operation 602.

Figure 7:
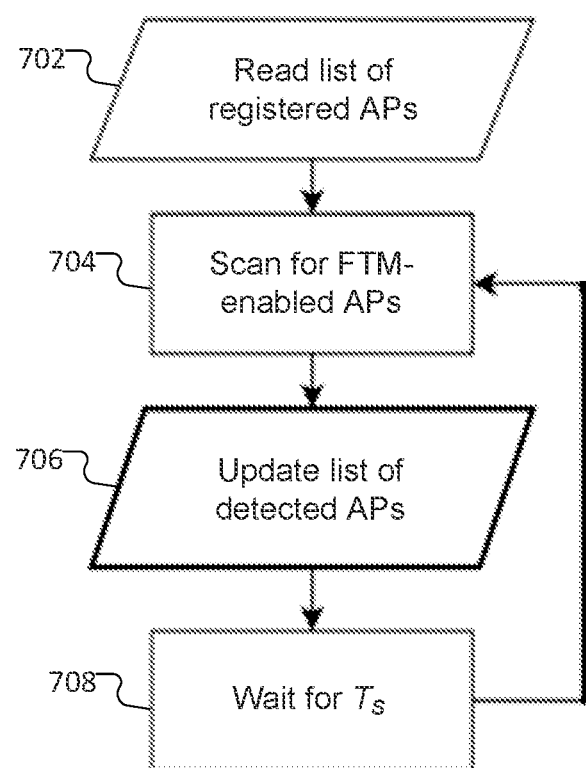
FIG. 7 illustrates an example flow chart showing the discovery operation of FIG. 6 according to various embodiments of the present disclosure.

FIG. 7 illustrates an example flow chart showing the discovery operation 602 according to various embodiments of the present disclosure. As discussed above, a purpose of the scanning operation 702 is to periodically determine the registered anchor points 603 with known coordinates that are available for ranging. In one example, if the positioning system uses WLAN access points can play the role of anchor points, and the discovery operation 602 performs a Wi-Fi scan to detect registered access points. Apart from the task of discovering APs, the discovery operation 602 can further shortlist the set of discovered APs to limit the ranging overhead.

As shown in FIG. 7, the discovery operation 602 starts with operation 702, which can correspond to the startup of the process 600. At operation 702, the STA 111 reads a list of registered FTM responders. The list limits the set of FTM responders to those deployed by the operator of the indoor positioning system for the purpose of positioning. Afterwards (and, in some embodiments, for the entire lifetime of the app), the STA 111 performs the following operations in the following order:

At operation 704, the STA 111 scans for, and detects, FTM responders (i.e., FTM-enabled APs) in the vicinity. The FTM responders may advertise support for FTM by setting to true the Fine Timing Measurement Responder field of the Extended Capabilities element in their beacon frames.

At operation 706, the STA 111 intersects the set of registered FTM responders, which has a size A, with the set of detected FTM responders to produce a set of detected FTM responders, or detected APs 603, which has a size $A_S \le A$.

At operation 708, the STA 111 waits for a scanning period T s before going back to operation 704. In some instances, the STA 111 returns to operation 704 before the wait timer runs out (i.e., before the scanning period $T_S$ expires). For example, the STA 111 may immediately jump to operation 704 if the STA 111 receives an external scan request, such as from the positioning operation 608, upon the detection of a significant and rapid change in position of the STA 111. Other steps performed by the positioning operation 608 are discussed in further detail below, Ranging Operation 604.

Figure 8:
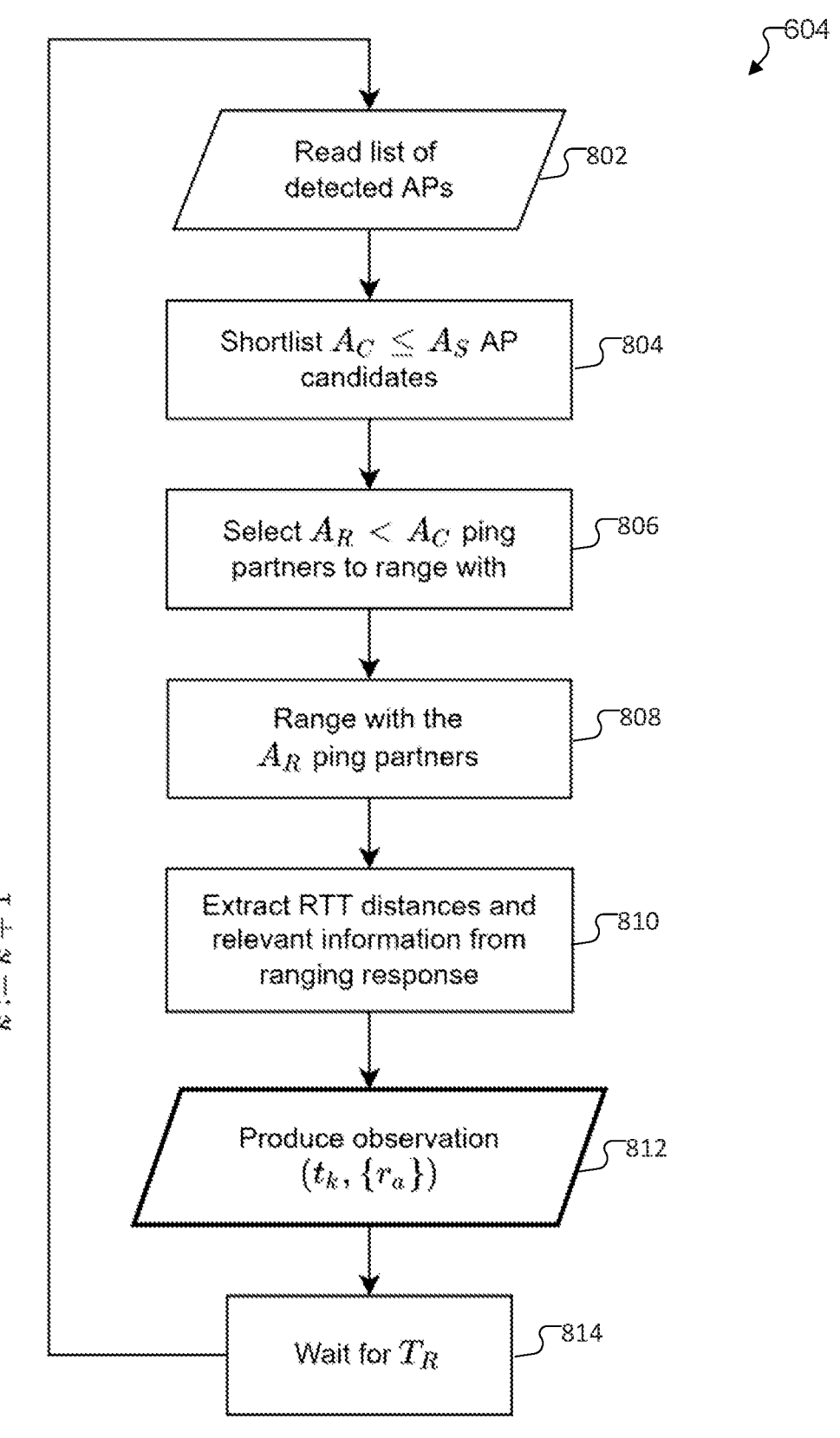
FIG. 8 illustrates an example flow chart showing the ranging operation of FIG. 6 according to various embodiments of the present disclosure.

FIG. 8 illustrates an example flow chart showing the ranging operation 604 according to various embodiments of the present disclosure. The ranging operation 604 selects a subset of the discovered APs 603 to range with, based on the known device position or inferred distances with the APs 603, and then ranges with the selected subset of APs 603 to obtain ranging measurements. The ranging operation 604 further extracts, processes, and converts the ranging measurements into the distance measurements 605 between the STA 111 and the APs 603. As discussed above, a purpose of the ranging operation 604 is to produce and stream the distance measurements 605 to be used for position estimation (e.g., by the positioning operation 608).

As shown in FIG. 8, the ranging operation 604 starts with operation 802, which is performed after the discovery operation 602 generates the first set of detected APs 603. At operation 802, the STA 111 reads the set of detected APs 603.

At operation 804, the STA 111 performs a first round of coarse selection that shortlists a set of APs from the set of $A_S$ APs in the set of detected APs 603. The shortlist has a size $A_C \le A_S$. The STA 111 can perform the coarse selection by choosing the set of $A_C$ APs that are the closest to the STA 111, with distance is determined using the most recent estimate of the position of the STA 111. If no position estimate of the STA 111 is available yet, the value of $A_C$ can be set in different ways. One way is to set $A_C$ to $A_S$, and all detected APs become candidates for the next round of selection. Other ways are to choose the first $A_C$ APs in the set of detected APs 603, or simply choose $A_C$ APs arbitrarily.

At operation 806, the STA 111 performs a second round of finer selection that selects a set of $A_R$ ping partners (i.e., APs to range with) out of the $A_C$ candidates in the shortlist generated in operation 804. The STA 111 obtains the set of ping partners by solving a constrained or unconstrained optimization problem involving one or more objective functions and/or constraints, either exactly or by means of an approximation. In some embodiments, the STA 111 selects the set of APs that minimize a two-dimensional or three-dimensional dilution of precision (DOP) metric, which is commonly used in satellite navigation (e.g., GPS) to relate the error in the position of the target object to the errors in distance measurements.

At operation 808, the STA 111 prepares and sends ranging requests to the $A_R$ ping partners through the FTM mechanism described earlier, and waits for ranging results.

At operation 810, the STA 111 computes the RTT distances between the STA 111 and the $A_R$ ping partners. For example, in some embodiments, the STA 111 extracts measurements of the distance between the STA 111 and each of the $A_R$ APs obtained through FTM exchanges. Alternatively, the STA 111 extracts the RTT between the STA 111 and each of the APs and applies a scaling factor to convert that into a distance. Additionally, the STA 111 may extract or compute other key information such as the RSSI, RTT distance standard deviation, and other statistics.

At operation 812, the STA 111 produces an observation $(t_k, \{y_a\})$, where $t_k$ is the timestamp at which the ranging response was received by the STA 111, and $\{y_a\}$ is the set of RTT distances from each of the $A_V$ valid APs, i.e., ping partners that responded to the ranging request. Here, $A_V \le A_R$.

At operation 814, the STA 111 waits for a ranging period $T_R$ before going back to operation 802.

An RTT distance is said to be missing if one of the following events happens:

its corresponding AP was not detected by the Wi-Fi scan.

its corresponding AP did not make the short list.

its corresponding AP was not selected to be a ping partner.

its corresponding AP did not respond to the ranging request.

there was an error processing the ranging response from its corresponding AP.

Sensing Operation 606

The STA 111 performs the sensing operation 606 to collect and convert sensor readings 607 into inputs to the positioning algorithm executed during the positioning operation 608, which is tasked with continuously estimating the device position. The sensing operation 606 can detect steps as the user is walking, and can determine the size s and direction $\theta$ of the steps. In one example, the sensing operation 606 computes the size and direction of a compound step $s_k$ and $\theta_k$, if any, taken between estimation epochs k−1 and k. A compound step is defined herein as the sum of steps over a certain period of time. The step size and direction can be determined from a combination of sensors of the 610, for example, including the magnetometer, accelerometer, and gyroscope. The details of computing the step size and position from sensor data can be accomplished, for example, by the above-described PDR methods or any other suitable algorithm or technique.

Positioning Operation 608.

Figure 9:
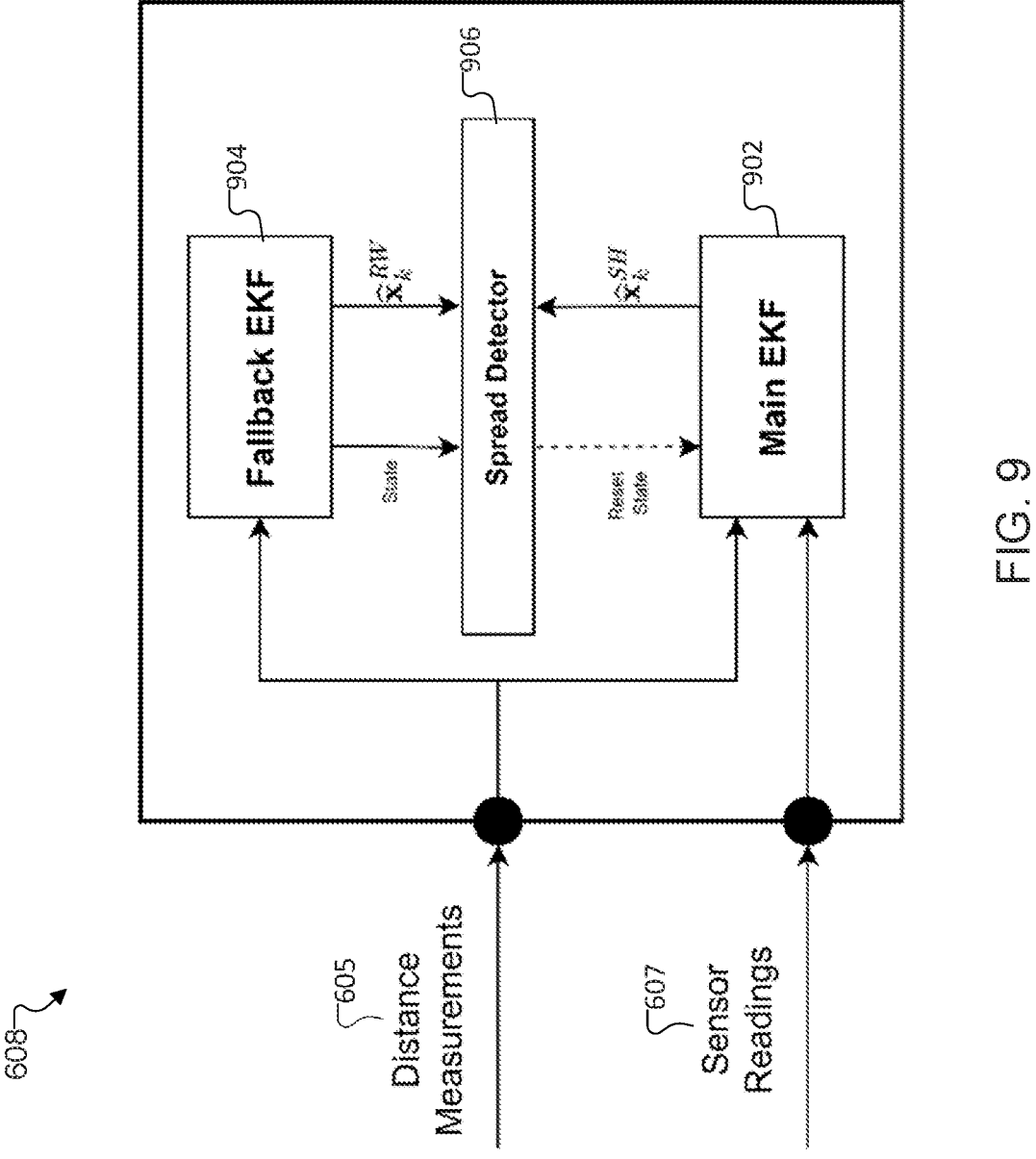
FIG. 9 illustrates a block diagram showing an example of the positioning operation of FIG. 6 according to various embodiments of the present disclosure.

As discussed above, a purpose of the positioning operation 608 is for the STA 111 to estimate the position of the STA 111 from the distance measurements 605 and the sensor readings 607. FIG. 9 illustrates a block diagram showing an example of the positioning operation 608 according to various embodiments of the present disclosure.

In the positioning operation 608, the STA 111 runs a main filter 902 (e.g., an EKF) on the stream of distance measurements 605 to get an accurate position estimate. For the main filter 902, the positioning operation 608 uses a motion model, which will be referred to as step and heading (SH) in this disclosure, to predict the next position and compute the covariance of the prediction. The STA 111 also runs a fallback filter 904 on the distance measurements 605. For the fallback filter 904, the positioning operation 608 uses another motion model, which will be referred to as random walk (RW) in this disclosure, to predict the next position and compute the covariance of the prediction. In some embodiments, the positioning operation 608 can use the same observation model for the EKF-SH as the one used for the EKF-RW. In some embodiments, the positioning operation 608 can run the EKF-SH indefinitely and in parallel with the EKF-RW.

The main filter 902 uses the EKF-SH model to predict the next position and compute the covariance of the prediction as follows:

$$x_k = x_{k-1} + s_k \cdot \begin{bmatrix} \cos \theta_k \\ \sin \theta_k \end{bmatrix} + v_k,$$

where $x_k$ is the current state, $x_{k-1}$ is the last state, $s_k$ is the step size (length), $\theta_k$ is the step direction, and $v_k$ is the step error. Here, $v_k \sim N(0, Q_k)$, where $v_k$ is a Gaussian random variable that represents the error in the compound step taken between estimation epochs k−1 and k and accounts for errors in both step size and step direction. Computing the covariance matrix $Q_k$ of the step error $v_k$ will be described in greater detail below.

In some embodiments, the EKF-SH model includes the following steps for every received observation:

1. Fetch observations produced by the ranging operation 604, which includes $A_V$ distance measurements 605 and the timestamp at which they were received.

2. Define values for the step size error $\sigma_S$ and the step heading error $\sigma_\theta$. In one example, the positioning operation 608 can choose constant values for $\sigma_S$ and $\sigma_\theta$. In another example, the positioning operation 608 can deduce $\sigma_S$ and $\sigma_\theta$ from a recent history of position estimates $\{\hat{x}_k\}$.

3. Compute the coordinates of four points, A, B, C, and D, around the most recent estimate $\hat{x}=(\hat{x},\hat{y})$ as follows:

$$A=(\hat{x}+(S+\sigma_S)\cdot\cos \theta, \hat{y}+(S+\sigma_S)\cdot\sin \theta)$$

$$D=(\hat{x}+(S-\sigma_S)\cdot\cos \theta, \hat{y}+(S-\sigma_S)\cdot\sin \theta)$$

$$D=(\hat{x}+S\cdot\cos(\theta+\sigma_\theta), \hat{y}+S\cdot\sin(\theta+\sigma_\theta))$$

$$B=(\hat{x}+S\cdot\cos(\theta-\sigma_\theta), \hat{y}+S\cdot\sin(\theta-\sigma_\theta))$$

4. Compute the variance of the horizontal and vertical errors $\sigma_X^2$ and $\sigma_Y^2$, as well as their covariance $\sigma_{XY}$ as follows:

$$\sigma_X^2 = \sin^2\theta \cdot \left(\frac{\overline{DB}}{2}\right)^2 + \cos^2\theta \cdot \left(\frac{\overline{AC}}{2}\right)^2$$

$$\sigma_Y^2 = \cos^2\theta \cdot \left(\frac{\overline{DB}}{2}\right)^2 + \sin^2\theta \cdot \left(\frac{\overline{AC}}{2}\right)^2$$

$$\sigma_{XY} = \left(\left(\frac{\overline{DB}}{2}\right)^2 - \left(\frac{\overline{AC}}{2}\right)^2\right) \cdot \cos \theta \cdot \sin \theta$$

where $\overline{UV}$ denotes the distance between the two points U and V.

5. Build the matrix $Q_k$ as $$Q_k = \begin{bmatrix} \sigma_X^2 & \sigma_{XY} \\ \sigma_{XY} & \sigma_Y^2 \end{bmatrix}$$

6. Determine the step size $s_k$ and direction $\theta_k$ from sensors in the IMU, e.g., accelerometer, magnetometer, gyroscope. The positioning operation 608 maps the time series of the sensor readings into a step size and direction. In one example, the positioning operation 608 can evaluate a closed-form algebraic function that takes as an input the time series of sensor readings and produces as an input the step size and direction. In another example, the positioning operation 608 can train a supervised machine learning model on a time series of sensor readings, and then use this model to predict the step size and direction.

7. Predict the next position it $\hat{x}_{k|k-1}$ using the latest estimate $\hat{x}_k$ and the motion model, and compute the a priori position covariance matrix $P_{k|k-1}$ as follows:

$$\hat{x}_{k|k-1} = \hat{x}_{k-1} + s_k \cdot \begin{bmatrix} \cos \theta_k \\ \sin \theta_k \end{bmatrix}$$

$$P_{k|k-1} = P_k + Q_k$$

8. Compute the measurement noise mean $\mu_{M,k}$ and covariance matrix $R_k$ for each of the surviving observations.

9. Update the position estimate to produce the a posteriori position estimate $\hat{x}_k$ and its covariance matrix $P_k$ by combining the predicted position $\hat{x}_{k|k-1}$ with the distance measurements $\{y_a\}$ as follows:

$$\hat{x}_k=\hat{x}_{k|k-1}+K_k(y_k-\mu_{M,k}-H_k\hat{x}_{k|k-1})$$

$$P_k=(I-K_kH_k)P_{k|k-1},$$

where $K_k$ is the Kalman gain and is a function of the measurement noise covariance matrix.

Figure 10:
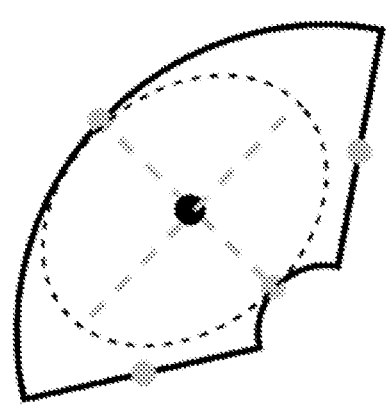
FIG. 10 illustrates an example chart showing motion and error models used for the EKF-SH of FIG. 9 according to various embodiments of the present disclosure.
Figure 10:
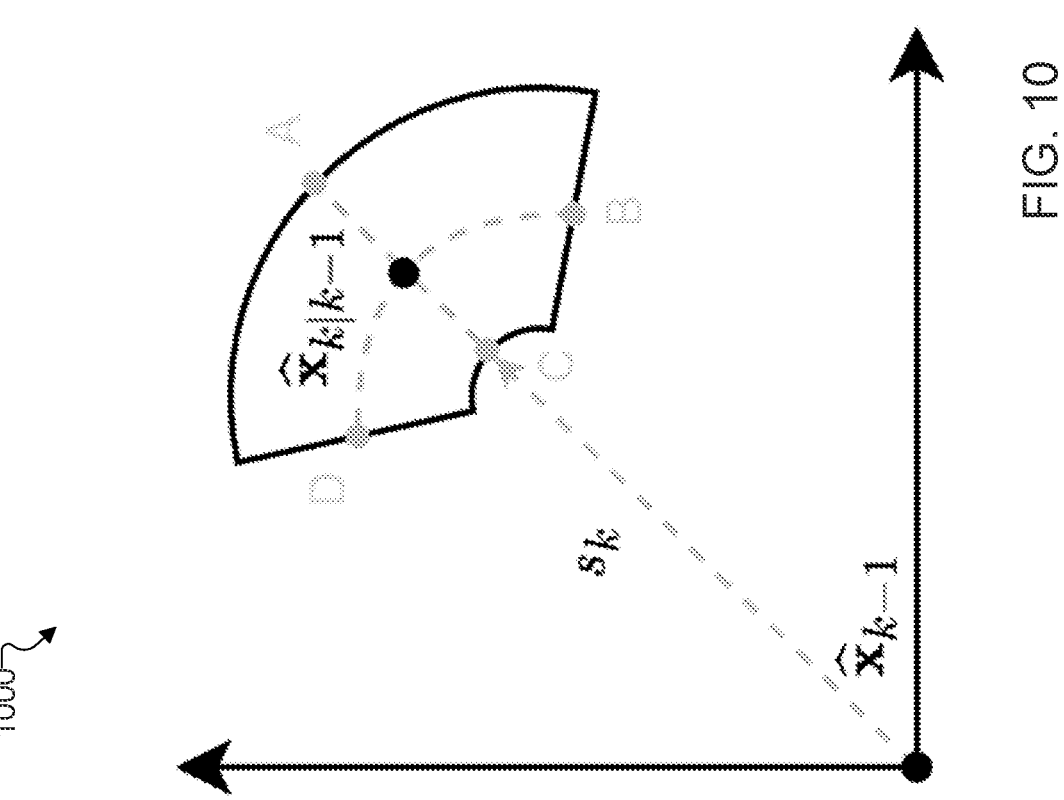

FIG. 10 illustrates an example chart 1000 showing motion and error models used for the EKF-SH according to various embodiments of the present disclosure.

The fallback filter 904 uses the EKF-RW model to predict the next position and compute the covariance of the prediction as follows:

$$x_k=X_{k-1}+v_k,$$

where $x_k$ denotes the current state, $x_{k-1}$ denotes the last state, and $v_k$ denotes an unknown step size. Here, $v_k \sim N(0, Q_k)$, where $Q_k=\text{diag}([(\sigma_P\Delta t_k)^2, (\sigma_P\Delta t_k)^2])$, $\Delta t_k=t_k-t_{k-1}$ is the duration between two consecutive observation timestamps, and o is a model parameter representing an average speed.

The fallback filter 904 additionally uses the following observation model, which relates the current observation, i.e., set of distance measurements, to the current position:

$$y_{a,k}=d(x_k,x_a)+w_k,$$

where $y_{a,k}$ is the distance measurement from AP a, and AP a is one of the valid APs. The term $d(x_k, x_a)$ denotes the distance between the STA 111, with a current position $x_k$, and AP a, and $w_k \sim N(\mu_k, R_k)$ denotes the observation noise. The fallback fitter 904 linearizes the above equation into the following:

$$y_k=H_kx_k+w_k,$$

where the observation vector $y_k$ stacks the distance measurements $\{y_a\}$; and the matrix $H_k$ is such that element at its a-th row is j-th column (corresponds to AP a and coordinate $x_j$), such as the following:

$$[H_k]_{a,j} = \frac{\partial d(x, x_a)}{\partial x_j} \Big|_{x_j=\hat{x}_{k|k-1,j}}$$

The positioning operation 608 executes the EKE-MAI model indefinitely, executing the following steps for every received observation $(t_k, \{y_a\})$:

1. Fetch observations produced by the ranging operation 604, which includes $A_V$ distance measurements 605 and the timestamp at which they were received.

2. Process the distance measurements 605. For example, the positioning operation 608 can detect and remove outliers. The positioning operation 608 can additionally or alternatively filter the distance measurements. The positioning operation 608 can also select a subset of distance measurements to compute the estimate instead of using the entire set of measurements by optimize a distance-based objective function, e.g., RSSI, or a position-based objective, e.g., geometric dilution of precision.

3. Set the variance $Q_k$ of the step size $v_k$ as $Q_k=\text{diag}([(\sigma_P\Delta t_k)^2, (\sigma_P\Delta t_k)^2])$, where $\Delta t_k=t_k-t_k$.

4. Predict the next position $\hat{x}_{k|k-1}$ using the latest estimate $\hat{x}_k$ k and the motion model, and compute the a priori position covariance matrix $P_{k|k-1}$ as follows:

$$\hat{x}_{k|k-1}=\hat{x}k-1$$

$$P_{k|k-1}=P_k+Q_k$$

5, Compute the measurement noise mean $\mu_{M,k}$ and covariance matrix $R_k$ for each of the surviving observations.

6. Update the position estimate to produce the a posteriori position estimate $\hat{x}_k$ and its covariance matrix $P_k$ by combining the predicted position $\hat{x}_{k|k-1}$ with the distance measurements $\{y_a\}$ as follows:

$$\hat{x}_k=\hat{x}_{k|k-1}+K_k(y_k-\mu_{M,k}-H_k\hat{x}_{k|k-1})$$

$$P_k=(I-K_kH_k)P_{k|k-1},$$

where $K_k$ is the Kalman gain and is a function of the measurement noise covariance matrix.

As shown in FIG. 9, during the positioning operation 608, the STA 111 also performs filter reconciliation, such as by using a spread detector 906. The positioning operation 608 monitors the position estimates generated by each of the two filters 902 and 904 (i.e., EKF-RW and EKF-SH) using the same sequence of distance measurements, and reconciles the two EKFs when the distance between their estimates grows sufficiently apart.

The positioning operation 608 executes the following steps for every round of measurements:

1. Read the position estimates $$\hat{x}_k^{SH} \text{ and } \hat{x}_k^{RW}$$

as generated by the main filter 902 (EKT-SH) and the fallback filter 904 (EKF-RW).

2. Compute the spread between the two position estimates $$d_k = \left\| \hat{x}_k^{RW} - \hat{x}_k^{SH} \right\|.$$

3. Time-average the instantaneous spread $d_k$ to obtain $\bar{d}$. In one example, a simple moving average can be used as the averaging method. In another example, an exponential moving average can be used.

4. Reset the stat of the EKF-SH to that of EKF-RW as soon as $\bar{d}>d_{min}$, by setting the a priori estimate $\hat{x}_{k|k-1}$ and its covariance $P_{k|k-1}$, as well as the a posteriori estimate $\hat{x}_{k|k}$ and its covariance $P_{k|k}$ to their counterparts inside the EKF-RW.

Figure 11:
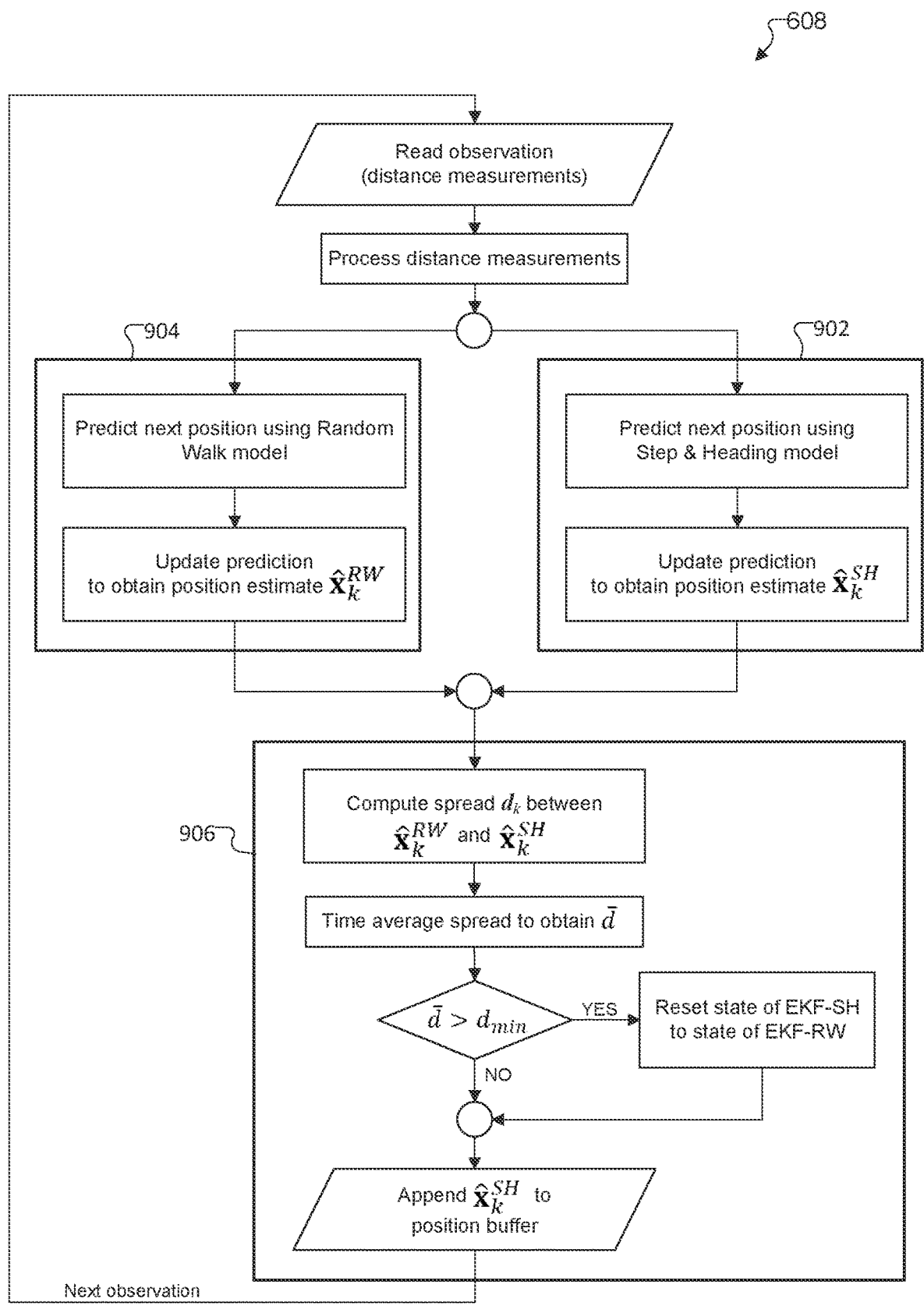
FIG. 11 illustrates a flow chart showing actions performed during the positioning operation of FIG. 6 according to various embodiments of the present disclosure.

FIG. 11 illustrates a flow chart showing actions performed during the positioning operation 608 according to various embodiments of the present disclosure. Reference numerals indicate the actions performed in conjunction with the main filter 902, the fallback filter 904, and the spread detector 906.

Figure 12:
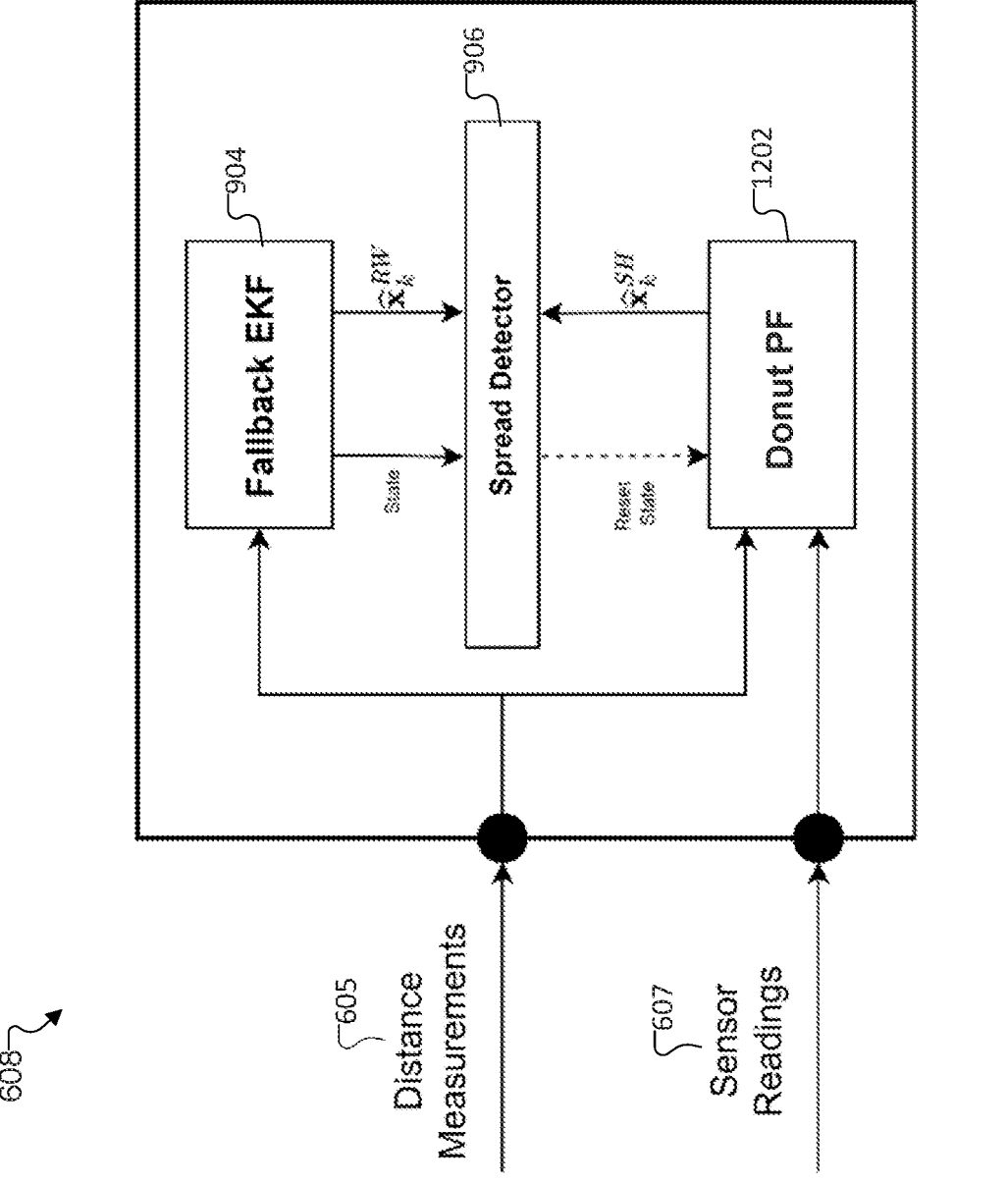
FIG. 12 illustrates a block diagram showing another example of the positioning operation of FIG. 6 according to various embodiments of the present disclosure.

FIG. 12 illustrates a block diagram showing another example of the positioning operation 608 according to various embodiments of the present disclosure. As shown in FIG. 12, the positioning operation 608 can use a particle filter 1202 (such as a donut particle filter) instead of the EKF main filter 902 to recursively estimate the position of the STA 111. The positioning operation 608 can further choose to sample the set of particles in the prediction step from the following motion/state transition model:

$$x_k^i = f_k\big(x_{k-1}^i, s_k\big) = x_{k-1}^i + (s_k + v_k)\cdot\begin{bmatrix} \cos U_k \\ \sin U_k \end{bmatrix}$$

where i is the index of the ith particle, $s_k$ is the step size, $$v_k \sim N(0, \sigma_S^2)$$

is the error in step size, and $U_k$ is a uniform random variable distributed between $[-\pi, \pi]$.

In the process shown in FIG. 12, the positioning operation 608 defines an initial particle set $S_0$, e.g., the singleton particle $$S_0 = \{(x_0^0, w^0)\}.$$

For every subsequent estimation round k, the positioning operation 608 executes the following standard particle filter steps using the particle filter 1202:

1. Initialize an empty set of particles $S_k = \{\ \}$.
2. Sample particles, i.e., positions $x_{k-1}^i$ and weights $w^i$, from the most recent particle set, i.e., $x_{k-1}^i \sim S_{k-1}$.
3. Move every particle forward according to the above motion model, i.e., $x_k^i = f_k(x_{k-1}^i, s_k)$.
4. Weight every updated position $x_k^i$ according to the likelihood of the observation $$w^i = p(y_k \mid x_k^i),$$

which can be chosen to be a product of probability density functions of Gaussian random variables that are distributed identically or non-identically.

5. Normalize the weights of the new particles $\{w^i\}$.
6. Append the set of particles with the new particles, i.e., $$S_k := S_k \cup \{(x_k^i, w^i)\}.$$

7. Compute the position estimate from the particle set $S_k$. In one example, the positioning operation 608 can compute the minimum mean square error estimate $$\hat{x}_k = \frac{1}{|S_k|} \Sigma_i x_k^i.$$

In another example, the positioning operation 608 can compute the maximum a posteriori estimate as the position $$x_k^i$$

corresponding to the largest weight $w^i$.

Figure 13:
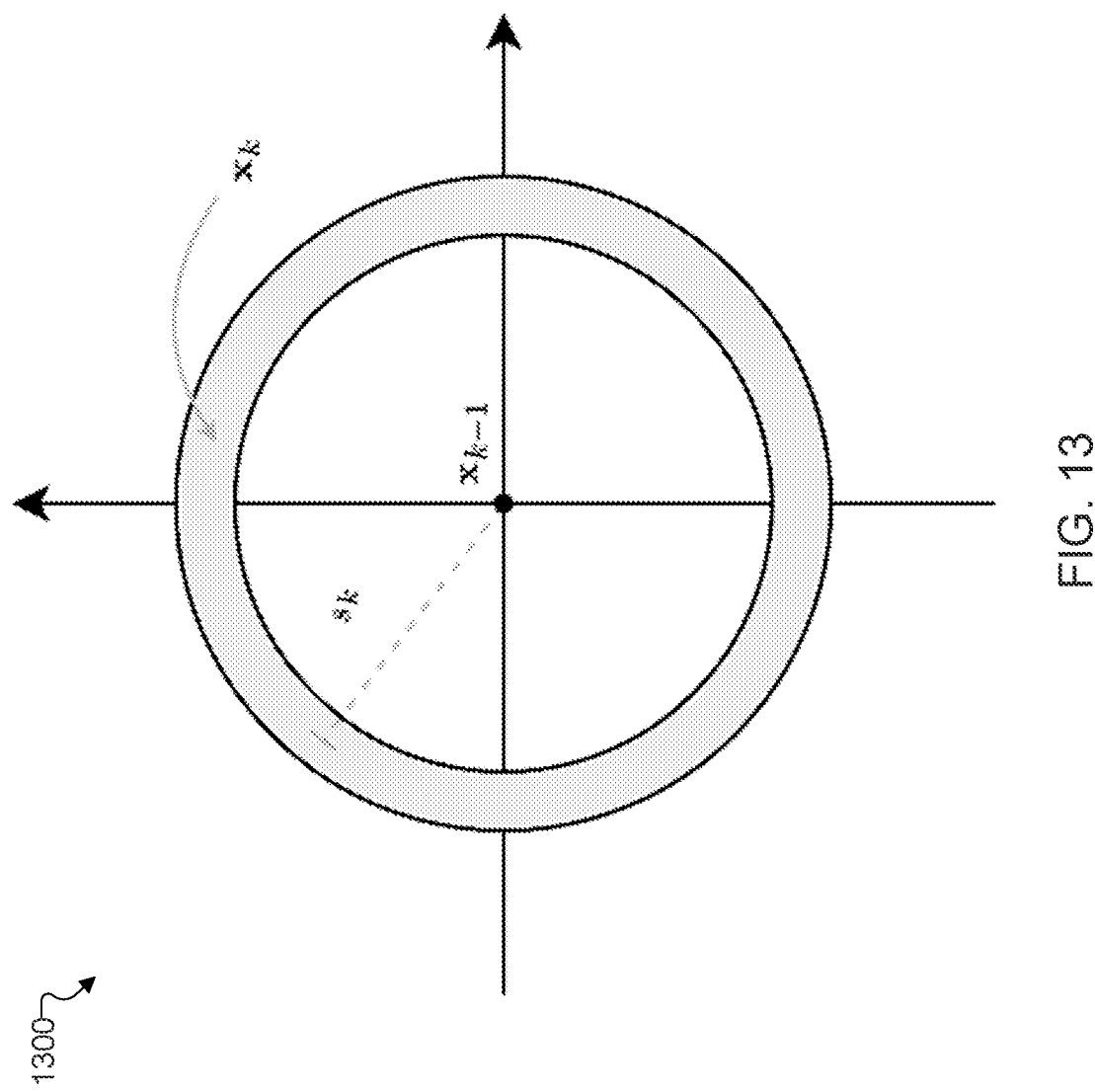
FIG. 13 illustrates an example donut error model used by the positioning operation of FIG. 6 for the particle filter of FIG. 12 according to various embodiments of the present disclosure.

FIG. 13 illustrates an example donut error model 1300 used by the positioning operation 608 for the particle filter 1202 according to various embodiments of the present disclosure. According to the model 1300, the new position of the particle $x_k$ falls within a "donut" shape centered around the old position $x_{k-1}$, and whose inner and outer radii average out to the step size $s_k$.

Online Offset Estimation

In some embodiments, the magnetometer or orientation sensor can be used by the discovery operation 602 to estimate the heading (i.e., the direction of motion) of the STA 111. The discovery operation 602 can correct the readings from the magnetometer or orientation sensor, or any sensor producing raw or processed readings to be used to infer heading, by compensating for a fixed or ne-varying offset in the readings. There are many different embodiments, including the ones below.

One-shot offset estimation: The discovery operation 602 computes a corrective offset $\phi$ short time after motion has started. The discovery operation 602 then executes the following steps:

1. Accumulate sensor readings s(t), e.g., from the magnetometer or orientation, up to time $t_k$ corresponding to the Kth round of estimation, which can coincide with the Kth round of observation.
2. Time average the sequence of sensor readings to obtain $\bar{s} = \bar{s}_K$ using a simple moving circular average (SMCA) defined as:

$$\bar{s} = \arctan\left(\frac{\Sigma_i \sin s(\tau_i)}{\Sigma_i \cos s(\tau_i)}\right)$$

for all sensor readings at $\tau_i$ satisfying $t_0 \le \tau_i \le t_K$.

3. Accumulate position estimates $\hat{x}_k$, e.g., those obtained by EKF-RW, up until the Kth round of estimation, and compute the implied heading as:

$$\theta_k = \arctan\left(\frac{\hat{y}_k - \hat{y}_{k-L}}{\hat{x}_k - \hat{x}_{k-L}}\right)$$

where the integer L is look-back step.

4. Time average the sequence of implied heading to obtain $\bar{\theta}_K$ using SMCA (as defined above) over the estimation/observation rounds k=L→K, or alternatively using a simple moving average.
5. Compute the offset $\phi = \bar{\theta}_K - \bar{s}_K$.

For estimation period K and onwards, the discovery operation 602 adds the corrective offset to s(t), which is used accordingly as an input to the EKT-SH.

Periodic offset estimation: The discovery operation 602 estimates the corrective offset q periodically with a period K using sensor readings in a time window of size W estimation/observation rounds ending at $t_K$, $t_{2K}$, etc. Every period jK, the discovery operation 602 executes similar steps as those under one-shot estimation but modified as follows:

1. Accumulate sensor readings s(t), e.g.; from the magnetometer or orientation, up to time $t_{jK}$ corresponding to the Kth round of estimation, which can coincide with the jKth round of observation.
2. Time average the sequence of sensor readings to obtain $\bar{s} = \bar{s}_{jK}$ using an SMCA of the readings $s(\tau_i)$ with timestamps $t_{jK-W+1} \le \tau_i \le t_{jK}$.
3. Accumulate position estimates $\hat{x}_k$, those obtained by EKF-RW, and compute the implied heading as before.
4. Time average the sequence of implied heading over the jth period to obtain $\bar{\theta}_{jK}$ using SMCA (as defined above) over the estimation/observation rounds k=jK−W+1→jK, or alternatively using a simple moving average.
5. Compute the offset $\phi_{jK} = \bar{\theta}_{jK} - \bar{s}_{jK}$.
6. Apply $\phi_{jK}$ to s(t) used in estimation rounds k=jK+1→(j+1)K of the EKF-SH.

Figure 14:
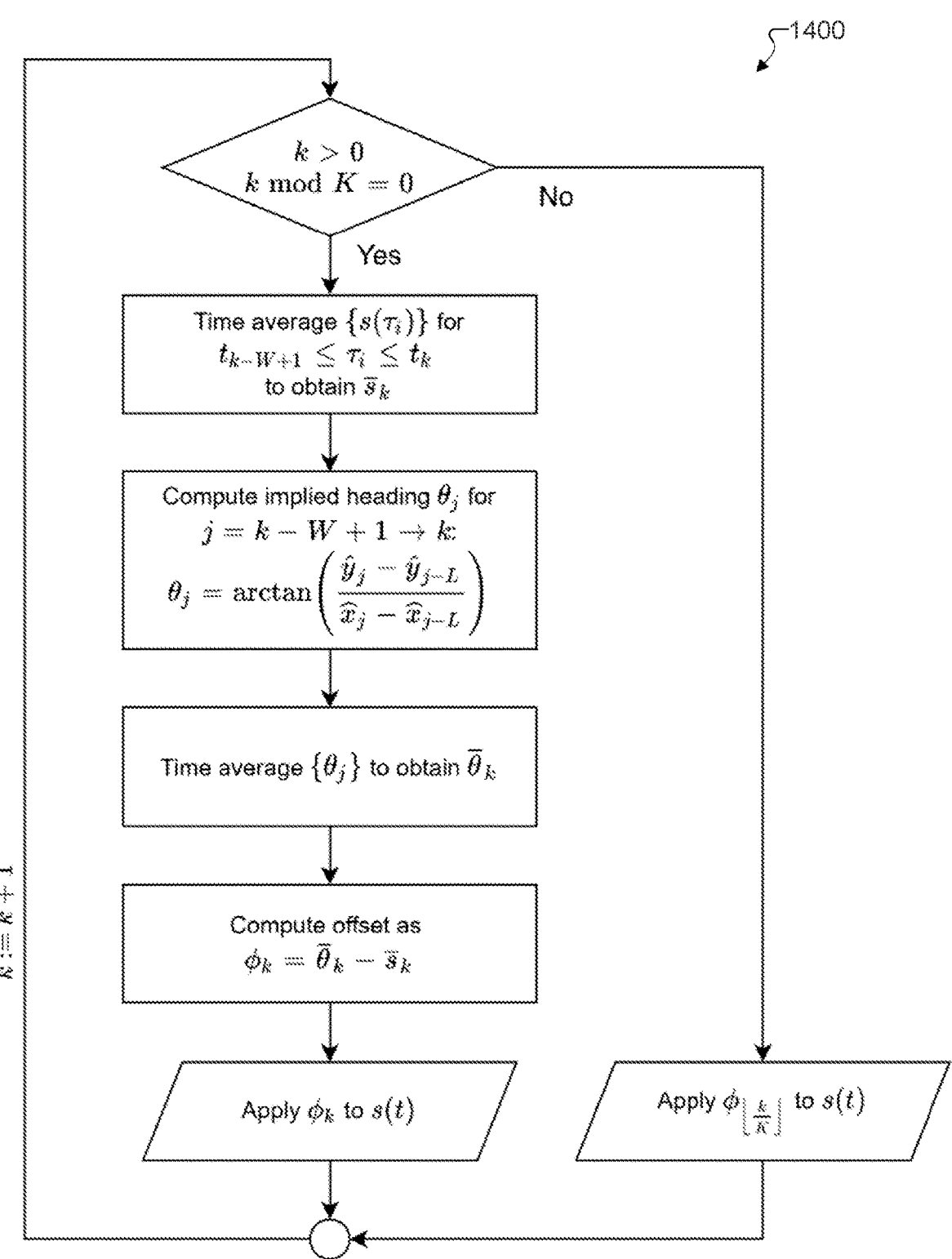
FIG. 14 illustrates a flowchart showing an example of periodic offset estimation according to various embodiments of the present disclosure.

FIG. 14 illustrates a flowchart 1400 showing an example of periodic offset estimation according to various embodiments of the present disclosure.

Continuous offset estimation: A special case of periodic offset estimation is when the offset estimation period K=1, i.e., the offset $\phi_k$ is computed every estimation round k using the last W+L position estimates and applied to the sensor readings used in the estimation round k+1.

Figure 15:
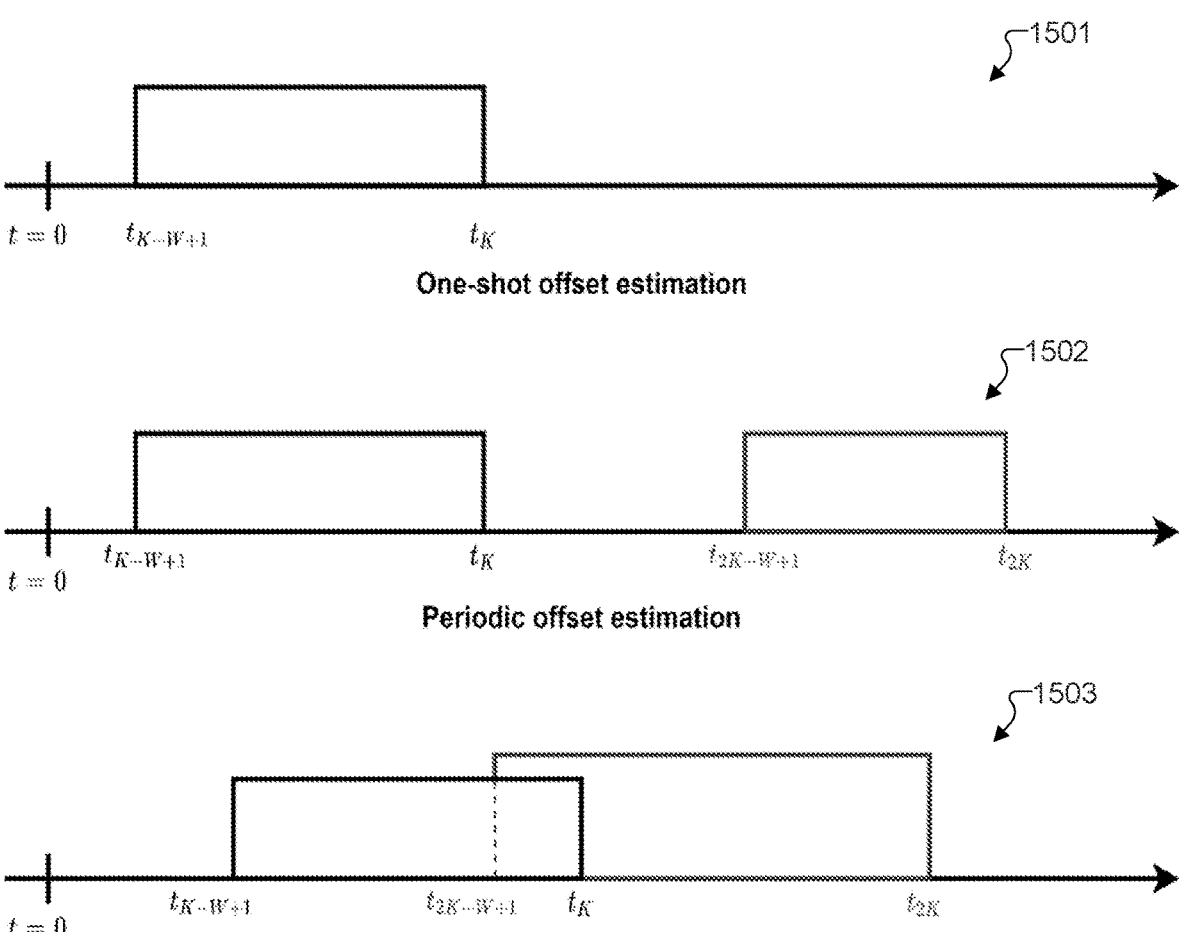
FIG. 15 illustrates example time diagrams for various examples of online offset estimation according to various embodiments of the present disclosure.
Figure 15:
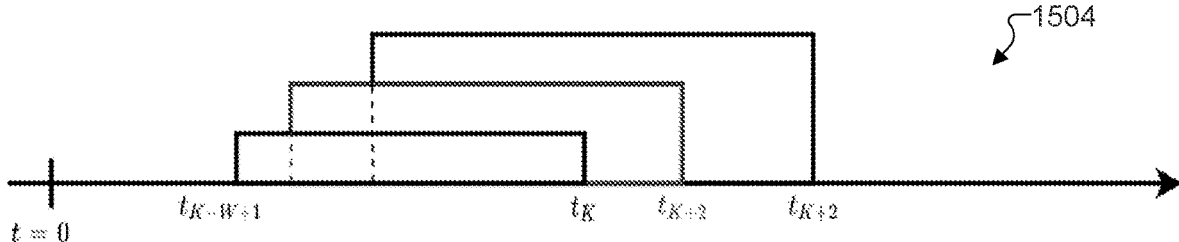

FIG. 15 illustrates example time diagrams 1501-1504 for the various examples of online offset estimation according to various embodiments of the present disclosure. The diagram 1501 shows one-shot offset estimation, in which offset estimation is performed only once, typically at the start. The diagram 1502 shows periodic offset estimation, in which offset estimation is performed at fixed intervals that are long enough to avoid common position estimates. The diagram 1503 shows periodic-offset estimation with overlapping windows, in which offset estimation is performed at fixed intervals using a sliding window of position estimates that strides by more than one position estimate. The diagram 1504 shows continuous offset estimation, in which offset estimation is performed continuously using a sliding window of position estimates that strides by exactly one position estimate.

Although FIGS. 6 through 15 illustrate examples of a process 600 for indoor positioning using ranging and sensing information and related details, various changes may be made to FIGS. 6 through 15. For example, various components in FIGS. 6 through 15 could be combined, further subdivided, or omitted and additional components could be added according to particular needs. In addition, while shown as a series of steps, various operations in FIGS. 6 through 15 could overlap, occur in parallel, occur in a different order, or occur any number of times. In another example, steps may be omitted or replaced by other steps.

Figure 16:
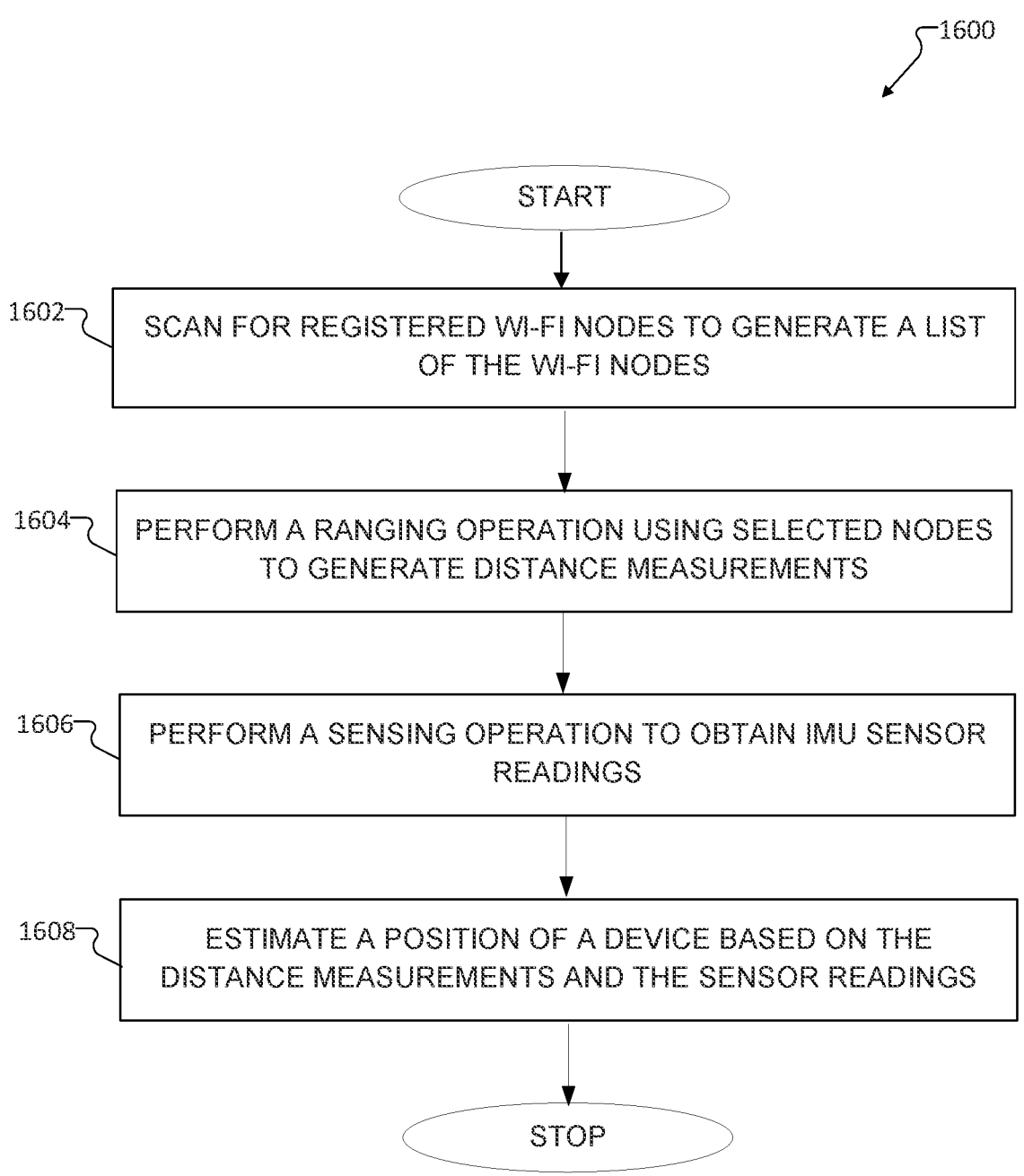
FIG. 16 illustrates a flow chart of a method for indoor positioning using ranging and sensing information according to various embodiments of the present disclosure.

FIG. 16 illustrates a flow chart of a method 1600 for indoor positioning using ranging and sensing information according to various embodiments of the present disclosure, as may be performed by one or more components of the wireless network 100 (e.g., the STA 111). The embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

As illustrated in FIG. 16, the method 1600 begins at step 1602. At step 1602, a device scans for registered Wi-Fi nodes with known coordinates to generate a list of the registered Wi-Fi nodes. This could include, for example, the STA 111 performing the discovery operation 602 as shown in FIGS. 6 and 7 to find the discovered APs 603.

At step 1604, the device performs a ranging operation by (i) selecting nodes to range with from the list of the registered Wi-Fi nodes, and (ii) processing ranging responses from the selected nodes to generate a series of distance measurements. This could include, for example, the STA 111 performing the ranging operation 604 as shown in FIGS. 6 and 8 to generate the distance measurements 605.

At step 1606, the device obtains a series of sensor readings generated by one or more IMUs of a device. This could include, for example, the STA 111 performing the sensing operation 606 as shown in FIG. 6 to obtain the sensor readings 607.

At step 1608, the device estimates a position of the device based on the series of distance measurements and the series of sensor readings using first and second filtering operations that are performed in parallel. This could include, for example, the STA 111 performing the positioning operation 608 as shown in FIG. 9, 11, or 12 to estimate a position of the STA 111.

Although FIG. 16 illustrates one example of a method 1600 for indoor positioning using ranging and sensing information, various changes may be made to FIG. 16. For example, while shown as a series of steps, various steps in FIG. 16 could overlap, occur in parallel, occur in a different order, or occur any number of times.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An indoor positioning method, comprising:
   scanning for registered Wi-Fi nodes with known coordinates to generate a list of the registered Wi-Fi nodes;
   performing a ranging operation by (i) selecting nodes to range with from the list of the registered Wi-Fi nodes, and (ii) processing ranging responses from the selected nodes to generate a series of distance measurements;
   obtaining a series of sensor readings generated by one or more inertial measurement units (IMUs) of a device; and
   estimating a position of the device based on the series of distance measurements and the series of sensor readings using first and second filtering operations that are performed in parallel by determining a difference between a first estimated current position generated by the first filtering operation and a second estimated current position generated by the second filtering operation and resetting the first filtering operation based on the difference.

2. The method of claim 1, wherein:
   the first filtering operation operates on the series of distance measurements and the series of sensor readings; and
   the second filtering operation operates on the series of distance measurements.

3. The method of claim 2, wherein:
   the first filtering operation generates the first estimated current position based on the series of distance measurements and the series of sensor readings; and
   the second filtering operation generates the second estimated current position based on the series of distance measurements.

4. The method of claim 2, wherein:
   the first filtering operation is performed using a first Extended Kalman Filter or a particle filter; and
   the second filtering operation is performed using a second Extended Kalman filter.

5. The method of claim 1, wherein the ranging operation further comprises:
   sending ranging requests to the selected nodes; and
   obtaining the ranging responses from the selected nodes.

6. The method of claim 1, wherein the ranging operation further comprises:
   selecting a set of ping partners from the list of the registered Wi-Fi nodes, the set of ping partners comprising the selected nodes to range with;
   ranging with the set of ping partners to obtain the ranging responses;

generating round-trip time (RTT) distance measurements between the device and the ping partners based on the ranging responses;

generating an observation associated with a time based on the RTT distance measurements; and repeating the selecting, ranging, generating, and generating after a predetermined waiting period.

7. The method of claim 1, wherein the registered Wi-Fi nodes comprise access points (APs) configured to communicate with the device.

8. A device comprising:

a transceiver; and a processor operably connected to the transceiver, the processor configured to:

scan for registered Wi-Fi nodes with known coordinates to generate a list of the registered Wi-Fi nodes;

perform a ranging operation by (i) selecting nodes to range with from the list of the registered Wi-Fi nodes, and (ii) processing ranging responses from the selected nodes to generate a series of distance measurements;

obtain a series of sensor readings generated by one or more inertial measurement units (IMUs) of the device; and estimate a position of the device based on the series of distance measurements and the series of sensor readings using first and second filtering operations that are performed in parallel by determining a difference between a first estimated current position generated by the first filtering operation and a second estimated current position generated by the second filtering operation and resetting the first filtering operation based on the difference.

9. The device of claim 8, wherein:

the first filtering operation operates on the series of distance measurements and the series of sensor readings; and the second filtering operation operates on the series of distance measurements.

10. The device of claim 9, wherein:

the first filtering operation generates the first estimated current position based on the series of distance measurements and the series of sensor readings; and the second filtering operation generates the second estimated current position based on the series of distance measurements.

11. The device of claim 9, wherein:

the first filtering operation is performed using a first Extended Kalman Filter or a particle filter; and the second filtering operation is performed using a second Extended Kalman filter.

12. The device of claim 8, wherein to perform the ranging operation, the processor is further configured to:

send ranging requests to the selected nodes; and obtain the ranging responses from the selected nodes.

13. The device of claim 8, wherein to perform the ranging operation, the processor is further configured to:

select a set of ping partners from the list of the registered Wi-Fi nodes, the set of ping partners comprising the selected nodes to range with;

range with the set of ping partners to obtain the ranging responses;

generate round-trip time (RTT) distance measurements between the device and the ping partners based on the ranging responses;

generate an observation associated with a time based on the RTT distance measurements; and repeat the select, range, generate, and generate after a predetermined waiting period.

14. The device of claim 8, wherein the registered Wi-Fi nodes comprise access points (APs) configured to communicate with the device.

15. A non-transitory computer readable medium comprising program code that, when executed by a processor of a device, causes the device to:

scan for registered Wi-Fi nodes with known coordinates to generate a list of the registered Wi-Fi nodes;

perform a ranging operation by (i) selecting nodes to range with from the list of the registered Wi-Fi nodes, and (ii) processing ranging responses from the selected nodes to generate a series of distance measurements;

obtain a series of sensor readings generated by one or more inertial measurement units (IMUs) of the device; and estimate a position of the device based on the series of distance measurements and the series of sensor readings using first and second filtering operations that are performed in parallel by determining a difference between a first estimated current position generated by the first filtering operation and a second estimated current position generated by the second filtering operation and resetting the first filtering operation based on the difference.

16. The non-transitory computer readable medium of claim 15, wherein:

the first filtering operation operates on the series of distance measurements and the series of sensor readings; and the second filtering operation operates on the series of distance measurements.

17. The non-transitory computer readable medium of claim 16, wherein:

the first filtering operation generates the first estimated current position based on the series of distance measurements and the series of sensor readings; and the second filtering operation generates the second estimated current position based on the series of distance measurements.

18. The non-transitory computer readable medium of claim 16, wherein:

the first filtering operation is performed using a first Extended Kalman Filter or a particle filter; and the second filtering operation is performed using a second Extended Kalman filter.

19. The non-transitory computer readable medium of claim 15, wherein the program code that causes the device to perform the ranging operation further comprises program code to:

send ranging requests to the selected nodes; and obtain the ranging responses from the selected nodes.

20. The non-transitory computer readable medium of claim 15, wherein the program code that causes the device to perform the ranging operation further comprises program code to:

select a set of ping partners from the list of the registered Wi-Fi nodes, the set of ping partners comprising the selected nodes to range with;

range with the set of ping partners to obtain the ranging responses;

generate round-trip time (RTT) distance measurements between the device and the ping partners based on the ranging responses;

generate an observation associated with a time based on the RTT distance measurements; and repeat the select, range, generate, and generate after a
predetermined waiting period.

* * * * *